(12) United States Patent
Wakabayashi et al.

(10) Patent No.: US 9,389,758 B2
(45) Date of Patent: Jul. 12, 2016

(54) PORTABLE ELECTRONIC DEVICE AND DISPLAY CONTROL METHOD

(71) Applicant: FUJIFILM Corporation, Tokyo (JP)

(72) Inventors: Satoru Wakabayashi, Saitama (JP); Tsuneo Sato, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/508,671

(22) Filed: Oct. 7, 2014

(65) Prior Publication Data

US 2015/0026632 A1 Jan. 22, 2015

Related U.S. Application Data

(63) Continuation of application No. PCT/JP2012/083223, filed on Dec. 21, 2012.

(30) Foreign Application Priority Data

Apr. 9, 2012 (JP) .................................. 2012-088532

(51) Int. Cl.
| | |
|---|---|
| G06F 3/0483 | (2013.01) |
| H04N 5/232 | (2006.01) |
| G06F 3/0481 | (2013.01) |
| G03B 17/18 | (2006.01) |

(52) U.S. Cl.
CPC .......... *G06F 3/0483* (2013.01); *G06F 3/04817* (2013.01); *H04N 5/23209* (2013.01); *H04N 5/23293* (2013.01); *H04N 5/23296* (2013.01); *G03B 17/18* (2013.01); *H04N 5/23206* (2013.01); *H04N 5/23212* (2013.01)

(58) Field of Classification Search
CPC ..... G06F 4/04886; G06F 9/0443; G06F 3/14; G06F 3/03547
USPC ............ 345/172, 184; 717/100; 715/839, 840
See application file for complete search history.

(56) References Cited

U.S. PATENT DOCUMENTS

| | | | | |
|---|---|---|---|---|
| 5,179,653 | A | * | 1/1993 | Fuller ........................... 715/840 |
| 5,609,770 | A | * | 3/1997 | Zimmerman et al. ........ 210/739 |
| 6,697,105 | B1 | * | 2/2004 | Kato et al. ................. 348/211.6 |

(Continued)

FOREIGN PATENT DOCUMENTS

| | | |
|---|---|---|
| JP | 9-138858 A | 5/1997 |
| JP | 2002-297278 A | 10/2002 |

(Continued)

OTHER PUBLICATIONS

International Search Report for PCT/JP2012/083223 mailed on Jan. 29, 2013.

(Continued)

*Primary Examiner* — Jennifer To
*Assistant Examiner* — Jasmine Wan
(74) *Attorney, Agent, or Firm* — Birch, Stewart, Kolasch & Birch, LLP

(57) ABSTRACT

According to an aspect of the present invention, setting change of a parameter can be performed while checking the content of all parameters on the list screen without screen transition of the list screen. Parameters of a desired page can be set at the same time even if a use condition or the like of the device is changed, or only part of the parameters can be corrected and set. Therefore, a plurality of parameters can be quickly and appropriately set by minimum operation.

19 Claims, 15 Drawing Sheets

(56) References Cited

U.S. PATENT DOCUMENTS

| | | | |
|---|---|---|---|
| 7,617,279 B2* | 11/2009 | Nakajima et al. | 709/204 |
| 8,027,444 B1* | 9/2011 | Martin et al. | 379/201.01 |
| 2003/0064757 A1 | 4/2003 | Yamadera et al. | |
| 2003/0074647 A1* | 4/2003 | Andrew | 717/100 |
| 2005/0046884 A1* | 3/2005 | Ozaki | 358/1.9 |
| 2005/0216862 A1 | 9/2005 | Shinohara et al. | |
| 2007/0025877 A1* | 2/2007 | Hansen | 422/68.1 |
| 2007/0195186 A1* | 8/2007 | Okada | 348/333.02 |
| 2008/0016470 A1* | 1/2008 | Misawa et al. | 715/839 |
| 2008/0103375 A1* | 5/2008 | Kiani | 600/323 |
| 2009/0007020 A1 | 1/2009 | Suzuki et al. | |
| 2009/0009649 A1* | 1/2009 | Okamoto | 348/340 |
| 2009/0256806 A1* | 10/2009 | Chen | 345/172 |
| 2009/0315867 A1* | 12/2009 | Sakamoto | G06F 3/03547 345/184 |
| 2010/0182642 A1* | 7/2010 | Masuyama | 358/1.15 |
| 2011/0047297 A1* | 2/2011 | Tsunoda | 710/5 |
| 2014/0013266 A1* | 1/2014 | Chen et al. | 715/773 |

FOREIGN PATENT DOCUMENTS

| | | |
|---|---|---|
| JP | 2003-108280 A | 4/2003 |
| JP | 2005-301992 A | 10/2005 |
| JP | 2009-10775 A | 1/2009 |
| JP | 2009-44239 A | 2/2009 |
| JP | 2009-98966 A | 5/2009 |

OTHER PUBLICATIONS

Written Opinion of the International Searching Authority for PCT/JP2012/083223 mailed on Jan. 29, 2013.

* cited by examiner

PORTABLE ELECTRONIC DEVICE AND DISPLAY CONTROL METHOD

CROSS-REFERENCE TO RELATED APPLICATIONS

This application is a Continuation of PCT International Application No. PCT/JP2012/083223 filed on Dec. 21, 2012, which claims priority under 35 U.S.C. §119(a) to Japanese Patent Application No. 2012-088532 filed on Apr. 9, 2012. Each of the above application(s) is hereby expressly incorporated by reference, in its entirety, into the present application.

BACKGROUND OF THE INVENTION

1. Field of the Invention

The present invention relates to a portable electronic device and a display control method, and particularly, to a portable electronic device and a display control method that can quickly and appropriately set a plurality of parameters for setting each of a plurality of functions of the device.

2. Description of the Related Art

Conventionally, an image display apparatus is proposed, wherein a plurality of icons corresponding to setting items are displayed on a screen, a sub-menu corresponding to a selected icon is displayed on the screen when an icon corresponding to a desired setting item is selected, and a setting indicated by the selected icon is changed (updated) to a selected setting when a desired setting is selected from the sub-menu (PTL 1).

Specifically, the image display apparatus described in PTL 1 is applied to an imaging apparatus such as a digital camera. During an imaging mode, a plurality of icons related to functions of the camera (such as an icon related to setting of an image size and an icon related to self-timer setting) are displayed on a liquid crystal screen on a camera back surface along with a live-view image. When a desired icon is selected through a touch panel or the like, a sub-menu for selecting a setting related to the icon is displayed on the liquid crystal screen. When a desired setting is selected on the sub-menu, the selected setting is applied to the function of the camera.

For example, when an icon (icon button) related to the setting of the image size among the plurality of icons is tapped through the touch panel on the liquid crystal screen, a sub-menu indicating a list of image sizes of a still image to be imaged (buttons corresponding to a plurality of image sizes) is displayed on the liquid crystal screen. When a button corresponding to a desired image size is tapped on the sub-menu, the image size corresponding to the button is set. Then, the sub-menu is deleted, and the original liquid crystal screen is restored.

In a screen display method described in PTL 2, a plurality of first home position icons of a first layer (large classification) are displayed on a menu item selection screen. When a desired first home position icon is selected, a plurality of second home position icons of a second layer (small classification) are displayed. When a desired second home position icon is selected, a menu of a third layer including lower-level items of the second layer is displayed on a sub-menu screen, and a menu item can be selected and determined on the sub-menu screen.

CITATION LIST

Patent Literature

PTL 1: Japanese Patent Application Laid-Open No. 2009-10775

PTL 2: Japanese Patent Application Laid-Open No. 2003-108280

SUMMARY OF THE INVENTION

A screen of a display device of a portable electronic device, such as a digital camera, a portable phone, and a portable information terminal, is small, and there is a problem that a large amount of information cannot be displayed at a time.

In the invention described in PTL 1, a plurality of icons corresponding to a plurality of functions (setting items) of the device are displayed on the screen. When an icon corresponding to a desired setting item is selected, a sub-menu corresponding to the icon is displayed on the screen in association with the selected icon, and a desired setting is selected from the sub-menu. Therefore, even if the screen is small, the desired setting can be performed just by selection operation in the screen. However, the sub-menu is displayed on the same screen along with the plurality of icons, and there is a problem that the number of icons that can be displayed at a time cannot be large.

Meanwhile, although a large number of icons can be displayed by arranging the icons on the entire screen, a sub-menu hides part of the icons when the sub-menu is displayed in this case. There is a problem that setting content in the hidden icons cannot be checked. Particularly, when the setting content of a plurality of icons is related, setting cannot be performed in the icon to be set while checking the setting content of the related icons, and this reduces the usability.

Furthermore, even if a user sets (customizes) each of a plurality of functions of a device according to the preference, the functions need to be customized again when a use condition or the like of the device is changed. For example, when various parameters of a camera function are customized to be suitable for imaging in a person mode in a digital camera, it might be better to customize the parameters again in imaging in a landscape mode. In this case, frequent setting is necessary, and this is cumbersome. PTL 1 does not describe a technique of easily and quickly performing various settings, changes, and the like indicated by the icons in such a case.

Meanwhile, in the invention described in PTL 2, the sub-menu screen is also displayed to select and determine a menu item as in the invention described in PTL 1. Transition of the display screen occurs, and there is a problem as in the invention described in PTL 1.

The present invention has been made in view of the circumstances, and an object of the present invention is to provide a portable electronic device and a display control method that can set a plurality of parameters for setting each of a plurality of functions of the device without screen transition of a list screen for the setting while checking content of all parameters and that can appropriately set the parameters by minimum operation even if a use condition or the like of the device is changed.

To attain the object, a portable electronic device according to an aspect of the present invention includes: a display unit; a storage unit that stores parameters for a plurality of pages, each page including a plurality of parameters for setting each of a plurality of functions of the device; a first display control unit that can display, on the display unit, a list screen in which a plurality of icons including a plurality of setting icons corresponding to each of the plurality of functions and a single page icon are two-dimensionally arranged, the list screen having a same arrangement pattern between the plurality of pages, wherein when an instruction input for selecting any page of the plurality of pages is received, a plurality of parameters corresponding to the selected page are read from the storage unit, content of the plurality of read parameters is displayed on each of the plurality of setting icons, and page information of a current list screen is displayed on the page icon; a second display control unit that receives an instruction input for selecting any one of the plurality of icons displayed on the display unit and that displays the selected icon and the icons not selected in an identifiable manner; a third display control unit that displays, when one setting icon of the plurality of setting icons is selected and an instruction input for setting a parameter corresponding to the selected setting icon is received, setting content of the parameter corresponding to the instruction input on the setting icon and that displays, when the page icon is selected and an instruction input for selecting a page is received, page information of the selected page on the page icon; and a parameter setting unit that updates a plurality of parameters corresponding to a page of a list screen currently displayed on the display unit among the plurality of pages stored in the storage unit based on setting content of the parameter.

The storage unit can store parameters for a plurality of pages, each page including a plurality of parameters for setting each of a plurality of functions of the device. As a result, a plurality of pages (a plurality of sets) can be stored, each page (each set) including a plurality of parameters customized by the user. The user can read a desired page according to a use status or the like of the device and can set each of a plurality of functions of the device by the plurality of parameters of the page.

The first display control unit can display, on the display unit, a list screen in which a plurality of icons including a plurality of setting icons corresponding to each of the plurality of functions and a single page icon are two-dimensionally arranged, the list screen having a same arrangement pattern between the plurality of pages. It is preferable that the plurality of icons are two-dimensionally arranged in a matrix over the entire screen of the display unit, and this can arrange a large number of icons even if the screen is small. The first display control unit can also read a plurality of parameters corresponding to any page of the plurality of pages from the storage unit, display content of the plurality of read parameters on each of the plurality of setting icons, and display page information of a current list screen on the page icon, allowing the user to visually recognize the current setting content of the parameters and the like.

When an instruction input for selecting any one of the plurality of icons displayed on the display unit is received, the second display control unit can display the selected icon and the icons not selected in an identifiable manner, allowing the user to check which icon is selected (active state).

When an instruction input for setting the parameter corresponding to the selected setting icon is received, the third display control unit displays the setting content of the parameter corresponding to the instruction input on the setting icon. The setting content of the parameter is information expressed by a number, a character, a sign, a pictorial character, or the like on the setting icon, and the user can instruct setting of the parameter in a state that the list screen is displayed (therefore, without screen transition of the list screen) at the setting change of the setting content of the parameter. Therefore, the user can appropriately perform setting change of the parameter related to a desired setting icon by minimum operation while checking the setting content of each setting icon displayed on the list screen. When an instruction input for selecting a page is received, the third display control unit displays page information (information indicating page number or the like) of the selected page on the page icon.

The parameter setting unit sets and updates a plurality of parameters corresponding to a page of a list screen currently displayed on the display unit among the plurality of pages stored in the storage unit based on setting content of the parameter that is set as described above. In the portable electronic device, a plurality of parameters of a page designated by the user or of a most recently set page are set as parameters for a plurality of functions, and each function is operated according to the set parameters.

In this way, in the portable electronic device according to the mode of the present invention, a plurality of parameters for setting each of a plurality of functions of the device can be set without screen transition of a list screen for the setting, while checking the content of all parameters. Appropriate setting can also be performed by minimum operation even if a use condition or the like of the device is changed.

In the portable electronic device according to another aspect of the present invention, it is preferable to further include a first operation unit for displaying the list screen on the display unit, wherein the first display control unit displays, on the display unit, a list screen of the two-dimensionally arranged icons corresponding to a plurality of parameters of a page operated or displayed lastly in a previous time when an instruction input is received from the first operation unit. Here, the "page operated or displayed lastly in a previous time" may not be a page in which a parameter is updated and set.

In the portable electronic device according to yet another aspect of the present invention, further included are: a second operation unit for selecting any of the two-dimensionally arranged icons; a third operation unit for switching setting content by the icon selected by the second operation unit; and a fourth operation unit for confirming the plurality of parameters displayed on the list screen, wherein the second display control unit displays the selected icon and the icons not selected in an identifiable manner based on an operation input from the second operation unit, the third display control unit switches the setting content displayed on the selected icon based on an operation input from the third operation unit, and based on an operation input from the fourth operation unit, the parameter setting unit updates the parameter corresponding to the page currently displayed on the display unit among the parameters of the plurality of pages stored in the storage unit based on the setting content of the parameter and sets the setting content of the parameter as a parameter applied to the device. When there is an operation input from the fourth operation unit, the parameter that is set corresponding to the setting icon is confirmed, and the parameter of the corresponding page stored in the storage unit is updated by the confirmed parameter.

In the portable electronic device according to yet another aspect of the present invention, further included are: a second operation unit for selecting any of the two-dimensionally arranged icons; and a third operation unit for switching setting content by the icon selected by the second operation unit, wherein when the page icon is selected by an operation of the second operation unit and an instruction input for selecting a page by an operation of the third operation unit is received, the first display control unit reads a plurality of parameters corresponding to the selected page among the parameters of the plurality of pages stored in the storage unit, displays the content of the plurality of read parameters on each of the plurality of setting icons, and displays page information of the selected page on the page icon. Therefore, when an instruction input for selecting a page by operation of the page icon is received, the page information displayed on the page icon is switched. A plurality of parameters corresponding to the selected page is read from the storage unit, and the display content of each setting icon of the list screen is switched.

In the portable electronic device according to yet another aspect of the present invention, it is preferable that when an instruction input of parameter setting is performed for any of the plurality of setting icons, if the setting content of the parameter for which the instruction is input is content that cannot be set at the same time as any of the parameters that are set for the setting icons other than the any setting icon, the third display control unit displays information indicating the fact on the display unit and does not display, on the setting icon, the setting content of the parameter for which the instruction is input or displays a warning. This can prevent setting a wrong parameter. The "display" here includes output of voice in addition to visual display by a character, a drawing, a symbol, coloring, and the like, and any form that can be recognized by the user is possible.

In the portable electronic device according to yet another aspect of the present invention, it is preferable that the first display control unit two-dimensionally arranges and displays the plurality of setting icons and the page icon so that the plurality of setting icons and the page icon do not overlap with each other. As a result, the display content of all icons (parameters that are set for each icon) can be checked, and particularly, an appropriate parameter can be set while viewing other parameters related to the parameter to be set.

In the portable electronic device according to yet another aspect of the present invention, it is preferable that the first display control unit displays the page icon on any of four corners of the list screen.

In the portable electronic device according to yet another aspect of the present invention, it is preferable that the first display control unit displays a plurality of common icons corresponding to a plurality of parameters common to a plurality of pages on the list screen. This is because there are parameters that do not have to be different parameters in each page.

In the portable electronic device according to yet another aspect of the present invention, it is preferable that the first display control unit displays the plurality of common icons together on a peripheral section of the list screen. It is preferable that the setting icons and the common icons are displayed together in different areas on the list screen, and the common icons are displayed together on a peripheral section of the list screen (for example, lower part of the list screen).

In the portable electronic device according to yet another aspect of the present invention, it is preferable that when any of the icons two-dimensionally arranged on the list screen of the display unit is selected, the selected icon is inverted and displayed. As a result, the selected icon and the icons not selected can be easily identified.

In the portable electronic device according to yet another aspect of the present invention, it is preferable that when any of the icons two-dimensionally arranged on the list screen of the display unit is selected, the second display control unit displays the information indicating the parameter that is set by the selected icon on an upper part of the list screen. This is because a display area of an individual icon is small, and sufficient information indicating the type of the parameter cannot be displayed.

In the portable electronic device according to yet another aspect of the present invention, it is preferable that the plurality of pages include a page including parameters automatically set by the device as parameters corresponding to the plurality of setting icons. Selecting the page can set the parameters automatically set by the device as parameters corresponding to the functions of the device. The automatically set parameters include at least one of a default parameter that is set in advance and a parameter obtained by the device through appropriate signal processing.

In the portable electronic device according to yet another aspect of the present invention, it is preferable that when the page including the parameters automatically set by the device is displayed, the first display control unit displays information indicating that the parameters are automatically set parameters on the setting icons corresponding to the parameters automatically set by the device. As a result, when the user selects the page, the user can recognize that the parameter cannot be arbitrarily changed.

The portable electronic device according to yet another aspect of the prevent invention further includes: an imaging unit including an imaging optical system and an imaging element that forms a subject image through the imaging optical system; an image processing unit that processes an image output from the imaging unit; and an image recording unit that records the image processed by the image processing unit, wherein the plurality of parameters include a parameter that is set at imaging by the imaging unit or a parameter that is set for the image processing in the image processing unit.

An invention according to yet another aspect of the present invention provides a display control method of a portable electronic device including: a display unit; and a storage unit that stores parameters for a plurality of pages, each page including a plurality of parameters for setting each of a plurality of functions of the device, the display control method including: a first display control step capable of displaying, on the display unit, a list screen in which a plurality of icons including a plurality of setting icons corresponding to each of the plurality of functions and a single page icon are two-dimensionally arranged, the list screen having a same arrangement pattern between the plurality of pages, wherein when an instruction input for selecting any page of the plurality of pages is received, a plurality of parameters corresponding to the selected page are read from the storage unit, content of the plurality of read parameters is displayed on each of the plurality of setting icons, and page information of a current list screen is displayed on the page icon; a second display control step of receiving an instruction input for selecting any one of the plurality of icons displayed on the display unit and displaying the selected icon and the icons not selected in an identifiable manner; a third display control step of displaying, when one setting icon of the plurality of setting icons is selected and an instruction input for setting a parameter corresponding to the selected setting icon is received, setting content of the parameter corresponding to the instruction input on the setting icon and of displaying, when the page icon is selected and an instruction input for selecting a page is received, page information of the selected page on the page icon; and a parameter setting step of updating a plurality of parameters corresponding to a page of a list screen currently displayed on the display unit among the plurality of pages stored in the storage unit based on setting content of the parameter.

In the display control method according to the mode of the present invention, a plurality of parameters for setting each of a plurality of functions of the device can be set without screen transition of the list screen for the setting while checking the content of all parameters, and appropriate setting can be performed by minimum operation even if a use condition or the like of the device is changed, as in the portable electronic device according to the present invention.

According to the present invention, in the setting of each of a plurality of functions (parameters related to the setting of each function) of the device, a list screen with a plurality of two-dimensionally arranged icons including a plurality of setting icons and a page icon is displayed. When an arbitrary setting icon is selected on the list screen, and an instruction input for setting the parameter corresponding to the selected setting icon is received, the setting content of the parameter corresponding to the instruction input is displayed on the setting icon, while the page (a plurality of parameters) can be switched based on operation of the page icon. As a result, the setting change of a parameter can be performed without screen transition of the list screen while checking the content of all parameters on the list screen. Furthermore, the parameters of a desired page can be set at the same time even if a use condition or the like of the device is changed, or only part of the parameters can be corrected and set. Therefore, a plurality of parameters can be quickly and appropriately set by minimum operation.

DETAILED DESCRIPTION OF THE EMBODIMENTS

Hereinafter, embodiments of a portable electronic device and a display control method of the portable electronic device according to the present invention will be described in detail with reference to the attached drawings.

First Embodiment

Configuration of Imaging Apparatus

Figure 1:
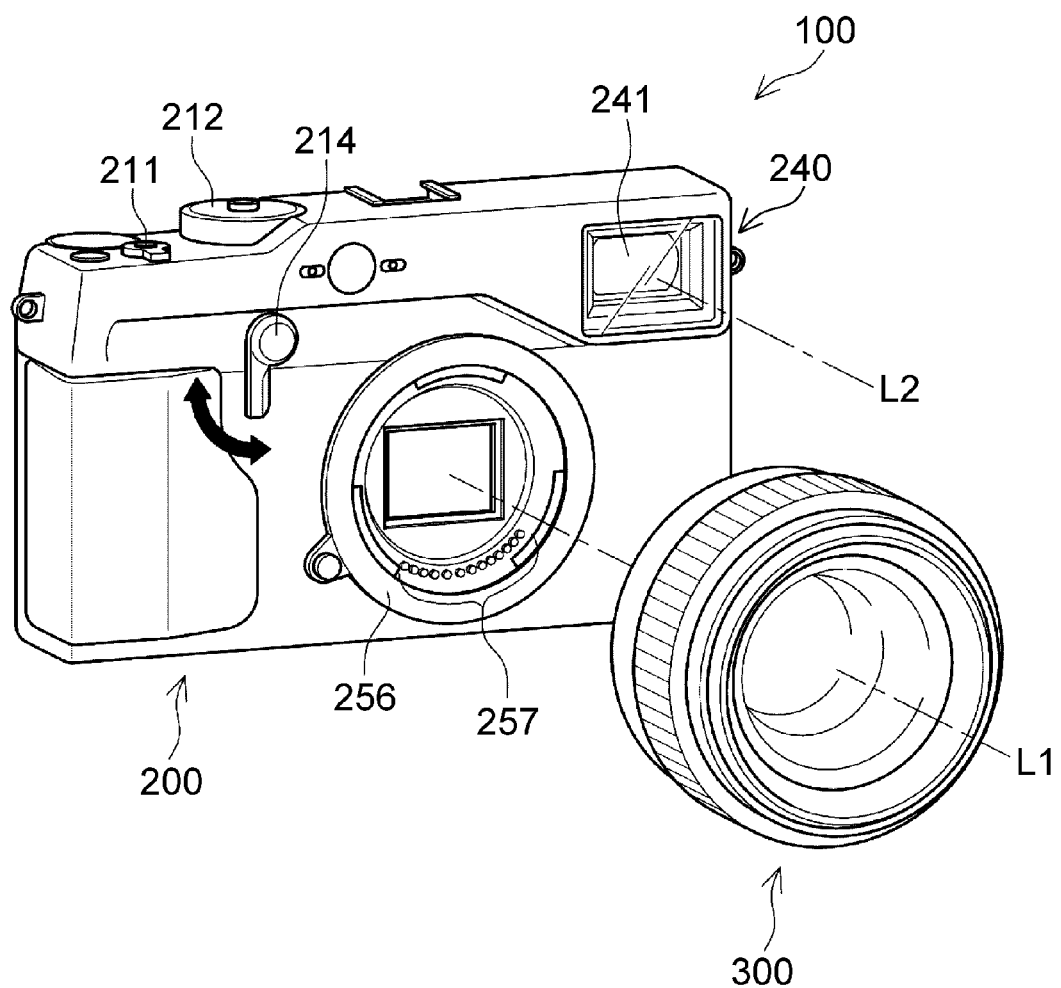
FIG. 1 is a front perspective view of an imaging apparatus 100 according to a first embodiment of the present invention.
Figure 2:
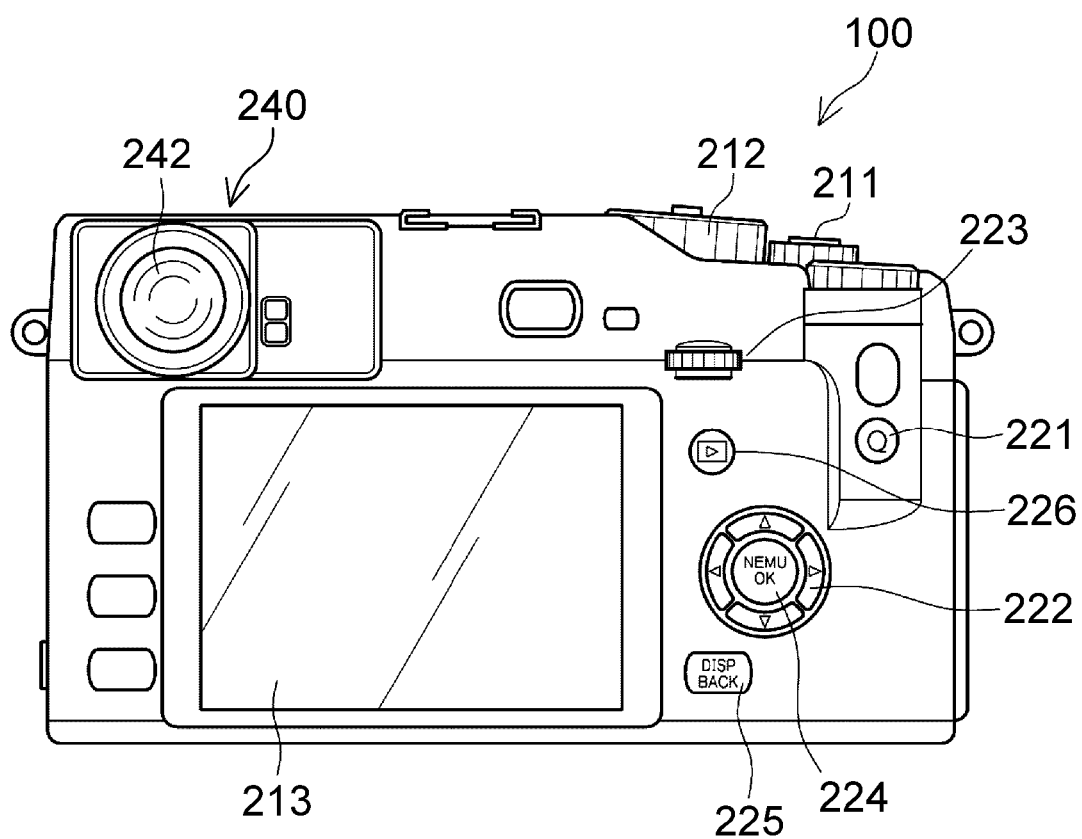
FIG. 2 is a rear view of the imaging apparatus 100.

FIG. 1 is a front perspective view of an imaging apparatus 100 (portable electronic device) that is a lens interchangeable camera according to an embodiment of the present invention, and FIG. 2 is a rear view of the imaging apparatus 100. The imaging apparatus 100 includes a camera main body 200 and an interchangeable lens 300 (imaging optical system, imaging unit) mounted on the camera main body 200 in an interchangeable manner. The camera main body 200 and the interchangeable lens 300 are mounted in an interchangeable manner by coupling a mount 256 (camera mount) included in the camera main body 200 and a mount 346 (see FIG. 3) on the side of the interchangeable lens 300 corresponding to the mount 256.

Other than the mount 256, a finder window 241, a finder switch lever 214, and the like of a finder 240 (details will be described later) are arranged on a front surface of the camera main body 200. When the finder switch lever 214 is rotated in an arrow SW direction, an image that can be visually recognized by the finder 240 is switched between an optical image and an electron image (described later). An optical axis L2 of the finder 240 is an optical axis different from an optical axis L1 of the interchangeable lens 300. A release button 211 (release button) and a dial 212 for setting an imaging mode are mainly arranged on an upper surface of the camera main body 200.

A finder eyepiece unit 242 of the finder 240, a monitor 213, a Q button 221, cross keys 222 (direction instruction buttons), a rotary dial 223, a MENU/OK key 224, a DISP/BACK button 225, and a reproduction button 226 are mainly arranged on a back surface of the camera main body 200.

The Q button 221 (first operation unit, fourth operation unit) functions as a button for commanding to display a plurality of icons (described later) arranged in a two-dimensional matrix on a screen of the monitor 213. The cross keys 222 (second operation unit) are used for operation of selecting an icon by moving a cursor position up, down, left, or right in parameter setting (described later) corresponding to each icon. Up/down keys of the cross keys 222 also function as zoom switches during imaging or reproduction zoom switches in a reproduction mode, and left/right keys also function as frame advance (forward direction/reverse direction advance) buttons in the reproduction mode. The rotary dial 223 (third operation unit) is used to change the display of a selected icon to a desired state in parameter setting (described later). The MENU/OK key 224 (fourth operation unit) is an operation key having a function as a menu button for commanding display of a menu on the screen of the monitor 213 and a function as an OK button for commanding confirmation, execution, or the like of selected content. The DISP/BACK button 225 is used to delete a desired target such as a selected item, to cancel instruction content, or to restore the previous operation state. The reproduction button 226 is used to instruct reproduction (display on the monitor 213) of a recorded image.

The monitor 213 (display unit) is used for live-view image display in the imaging mode and for reproduction image display in the reproduction mode and is also used to display a list screen in which icons for setting various parameters are arranged in a two-dimensional matrix (described later).

The finder 240 includes the finder window 241, the finder eyepiece unit 242, a liquid crystal shutter 243, and a finder variable power lens 244 as well as a prism, an eyepiece lens, an objective lens, a liquid crystal plate, a liquid crystal plate lens, and the like not shown.

The finder window 241, the finder eyepiece unit 242, the liquid crystal shutter 243, the objective lens, the prism, and the eyepiece lens are arranged on the optical axis L2, and the eyepiece lens guides subject light transmitted through the finder window 241, the liquid crystal shutter 243, the objective lens, and the prims to the finder eyepiece unit 242. As a result, an optical image of a subject is visually recognized from the finder eyepiece unit 242. Therefore, the finder window 241, the finder eyepiece unit 242, the liquid crystal shutter 243, the objective lens, the prism, and the eyepiece lens function as an optical finder.

The finder variable power lens 244 is arranged to be able to freely move parallel between a position out of the optical axis L2 and a position on the optical axis L2. When the finder variable power lens 244 is changed from a state not on the optical axis L2 to a state on the optical axis L2, the optical image observed from the finder eyepiece unit 242 is enlarged.

The liquid crystal shutter 243 is arranged on a back surface of the finder window 241 to be perpendicular to the optical axis of the subject light entered from the finder window 241. The liquid crystal shutter 243 is a liquid crystal panel including a liquid crystal layer sealed between a pair of substrates and in which a polarization direction is changed by a voltage applied to the liquid crystal layer, and for example, the liquid crystal shutter 243 is a liquid crystal panel with a resolution of 1600×900 pixels. The light crystal shutter 243 is configured to be able to switch, in each pixel, a light-blocking state of blocking the subject light entered from the finder window 241 based on control by a liquid crystal shutter control unit 239 (see FIG. 3) and a transmission state (non-light-blocking state) for transmitting the subject light. This switch is performed according to rotation operation of the finder switch lever 214.

A liquid crystal plate 248 is a liquid crystal panel with a resolution of 1600×900 pixels which is the same as the display resolution of the liquid crystal shutter 243. The liquid crystal plate 248 displays a framework indicating an imaging range that is a range of the subject light incident on a light receiving surface of an imaging element 202 (imaging element, imaging unit) based on a focal length (angle of view) of the interchangeable lens 300 according to control by a display control unit 210 (see FIG. 3). The liquid crystal plate 248 can also display an inverted image of the subject image and inverted images of characters and symbols indicating various imaging information (such as exposure mode, image size/image quality mode, and ISO sensitivity) based on control by the display control unit 210.

The image displayed on the liquid crystal plate 248 transmits through a liquid crystal plate lens arranged on an optical axis and enters prisms. The prisms include a first prism and a second prism, and a half mirror plane is formed at a junction between the first prism and the second prism. The half mirror plane is installed at an inclination of 45° relative to the optical axis of the liquid crystal plate lens. The liquid crystal plate lens enlarges the image displayed on the liquid crystal plate 248, and the half mirror plane inverts the left and right and reflects the image rightward in the drawings. The image (erect normal image) reflected by the half mirror plane transmits through the eyepiece lens and is guided to the finder eyepiece unit 242.

Therefore, the finder 240 can be used as an optical-type finder by putting the liquid crystal shutter 243 into an entire surface transmission state and displaying the framework and various imaging information on the liquid crystal plate 248. On the other hand, the finder 240 can be used as an electronic-type finder by putting the liquid crystal shutter 243 into an entire surface light-blocking state and displaying the inverted image of the subject image and the inverted images of the characters and symbols indicating various imaging information on the liquid crystal plate 248. The switch of the optical type/electronic type is performed according to rotation operation (arrow SW direction in FIG. 1) of the finder switch lever 214.

Figure 3:
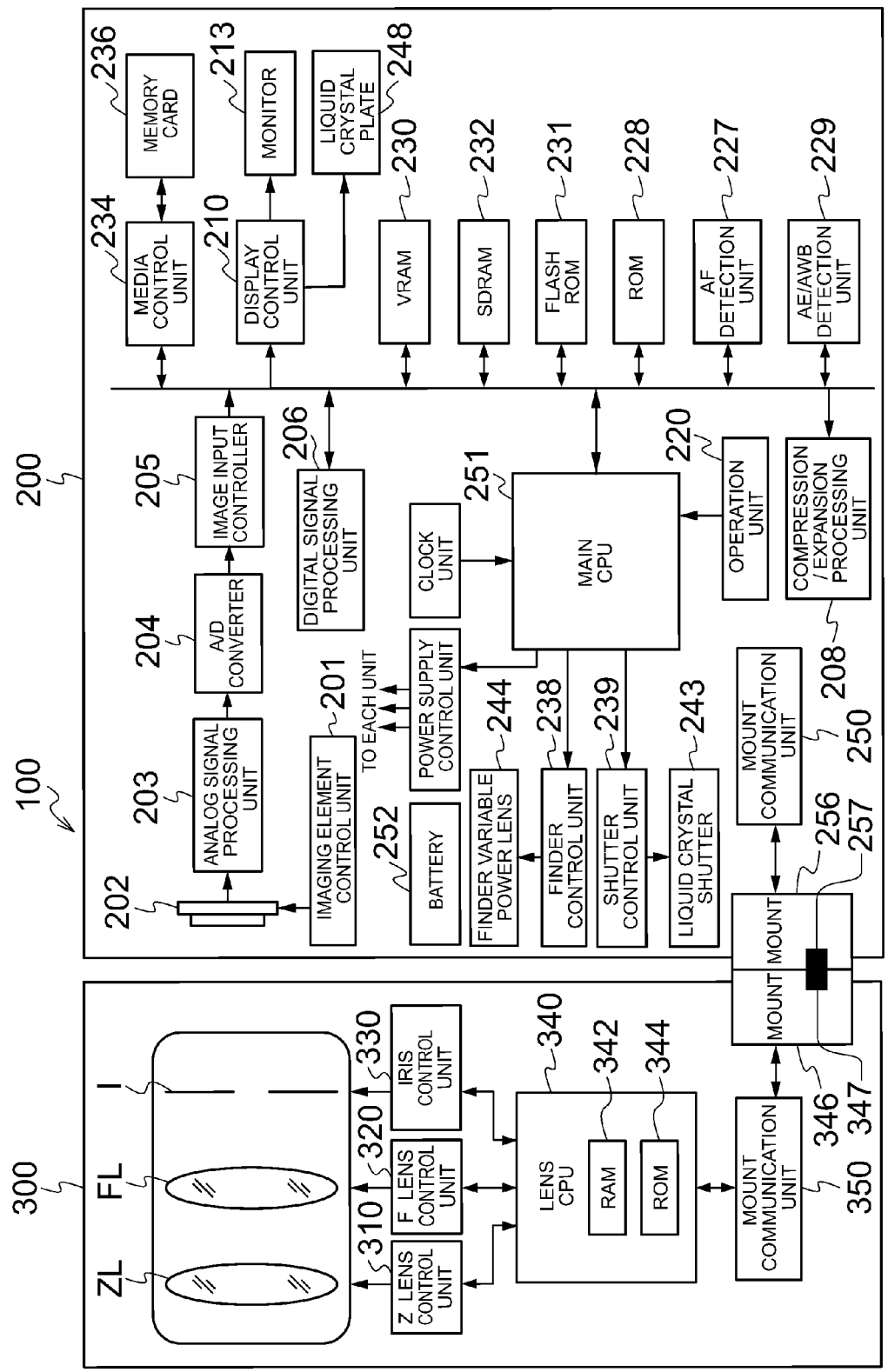
FIG. 3 is a block diagram showing a configuration of main parts of the imaging apparatus 100.

FIG. 3 is a block diagram showing a configuration of main parts of the imaging apparatus 100. A main CPU 251 of the camera main body 200 and a lens CPU 340 of the interchangeable lens 300 comprehensively control the operation of the imaging apparatus 100.

The main CPU 251 loads a camera control program stored in a flash ROM 231 on an SDRAM 232 and executes various processes while using the VRAM 230 and the SDRAM 232 as a work memory. The lens CPU 340 loads a camera control program stored in a ROM 344 on a RAM 342 and executes various processes while using the RAM 342 as a work memory. The SDRAM 232 is used as an arithmetic operation area of the main CPU 251 and is also used as a temporary storage area of image data. The flash ROM 231 (storage unit) stores a control program executed by the main CPU 251 and various data necessary for the control and also stores parameters of a plurality of pages, each set (one page) including a plurality of parameters for setting each of a plurality of functions of the imaging apparatus 100, and update information of the parameters. The settings of the parameters can be changed by switching the display of an icon corresponding to each parameter (described later). A mode of recording only the number of updates of each parameter, a mode of recording a parameter updated lastly, or a mode of recording update timing and update content can be used as a mode of recording the update information. A ROM 228 stores various setting information and the like related to the operation of the imaging apparatus 100 such as user setting information.

When the user operates an operation unit 220 including the Q button 221, the cross keys 222, the rotary dial 223, the MENU/OK key 224, the DISP/BACK button 225, and the like, a signal from the operation unit 220 is input to the main CPU 251. The main CPU 251 controls each circuit of the camera main body 200 based on the input signal and transmits and receives signals to and from the interchangeable lens 300 through the mount 256 and a mount communication unit 250 described later.

A terminal 257 is arranged on the mount 256, and a terminal 347 is arranged on the mount 346. When the interchangeable lens 300 is mounted on the camera main body 200, the corresponding terminal 257 and terminal 347 come into contact to enable communication (the terminal 257 and the terminal 347 in FIG. 1 and FIG. 2 are conceptually illustrated, and the positions and the number of terminals in the present invention are not limited to these). The camera main body 200 and the interchangeable lens 300 perform communication of a drive command, various control statuses (such as lens drive start/completion notification), setting information of a lens, and the like. Examples of the terminals include a grounding terminal, a synchronization signal terminal, a serial communication terminal, a control status communication terminal, and a power supply terminal from a battery 252 of the camera main body 200 to each unit of the interchangeable lens 300.

The interchangeable lens 300 mainly includes a zoom lens ZL, a focus lens FL, an iris I, the lens CPU 340, and the like.

The zoom lens ZL and the focus lens FL move back and forth on the same optical axis to perform zooming and focusing. A zoom lens control unit 310 drives the zoom lens ZL, and the focal length is changed. The main CPU 251 moves the zoom lens ZL in the interchangeable lens 300 according to operation of a zoom lever (not shown) performed by the user to change the focal length. A focus lens control unit 320 drives the focus lens FL.

The iris I controls the amount of light entering the imaging element 202 and controls the shutter speed and the exposure. The iris I includes, for example, five diaphragm blades, and the iris is controlled in six stages on 1 AV to 1 AV basis from a diaphragm value F1.4 to F11. An iris control unit 330 drives the iris I, and an opening amount is adjusted.

The lens CPU 340 determines amounts of movement of the zoom lens ZL and the focus lens FL based on current positions and lens target positions in the optical axis direction of the zoom lens ZL and the focus lens FL detected by a position sensor (not shown) and based on a lens adjustment value in the setting information of the interchangeable lens 300 loaded from the ROM 344 to the RAM 342.

The zoom lens control unit 310 moves the zoom lens ZL in the optical axis direction according to a command from the lens CPU 340 to change the imaging magnification. The focus lens control unit 320 moves the focus lens FL back and forth in the optical axis direction according to a command from the lens CPU 340 to focus the subject. The iris control unit 330 changes the diaphragm value of the iris I according to a command from the lens CPU 340.

The imaging element 202 is arranged in a subsequent stage of the zoom lens ZL, the focus lens FL, and the iris I and receives the subject light transmitted through the zoom lens ZL, the focus lens FL, and the iris I. The imaging element 202 includes a light receiving surface with a large number of light receiving elements arranged in a matrix. The subject light transmitted through the zoom lens ZL, the focus lens FL, and the iris I is focused on the light receiving surface of the imaging element 202, and each light receiving element converts the subject light to an electrical signal. Various photoelectric conversion elements, such as CMOS and CCD, can be used as the imaging element 202.

The imaging element 202 outputs, line by line, charges accumulated on each pixel as serial image signals in synchronization with a vertical transfer clock and a horizontal transfer clock supplied from an imaging element control unit 201 (imaging unit). The main CPU 251 controls the imaging element control unit 201 to control the drive of the imaging element 202.

Charge accumulation time (exposure time) of each pixel is determined by an electronic shutter drive signal provided from the imaging element control unit 201. The main CPU 251 instructs the charge accumulation time for the imaging element control unit 201.

When the imaging apparatus 100 is set to the imaging mode, output of an image signal is started to display a live-view image on the monitor 213. The output of the image signal for the live-view image is temporarily stopped when there is an instruction for main imaging, and the output is started again when the main imaging is finished.

The image signal output from the imaging element 202 is an analog signal, and an analog signal processing unit 203 imports the analog image signal.

The analog signal processing unit 203 (image processing unit) includes a correlated double sampling circuit (CDS) and an automatic gain control circuit (AGC). The CDS removes noise included in the image signal, and the AGC amplifies the noise-removed image signal by a predetermined gain. An A/D converter 204 (image processing unit) imports the analog image signal subjected to required signal processing by the analog signal processing unit 203.

The A/D converter 204 converts the imported analog image signal to a digital image signal with a gradation width of predetermined bits. The image signal is so-called RAW data and includes a gradation value indicating the density of R, G, and B of each pixel. When the imaging element 202 is a MOS imaging element, the A/D converter 204 is often included in the imaging element 202, or the correlated double sampling is not necessary.

An image input controller 205 (image processing unit) includes a line buffer with a predetermined capacity and accumulates an image signal of one frame output from the A/D converter 204. The image signal of one frame accumulated in the image input controller 205 is stored in the SDRAM 232.

The image signal of one frame stored in the SDRAM 232 is point-sequentially (order of pixels) imported to a digital signal processing unit 206 (image processing unit).

The digital signal processing unit 206 applies predetermined signal processing to the point-sequentially imported image signal of each color of R, G, and B and generates an image signal (Y/C signal) including a brightness signal Y and color difference signals Cr, Cb.

An AF detection unit 227 imports the image signal of R, G, and B stored in the SDRAM 232 according to a command of the main CPU 251 and calculates a focus evaluation value necessary for AF (Automatic Focus) control. The AF detection unit 227 includes: a high-pass filter that passes only high frequency components of a G signal; an absolute value processing unit; an AF area extraction unit that cuts out a signal in a predetermined focus area (hereinafter, called AF area) set on the screen; and an integration unit that integrates absolute value data in the AF area. The AF detection unit 227 outputs, as a focus evaluation value, the absolute value data in the AF area integrated by the integration unit to the main CPU 251. A system of searching a position with the maximum focus evaluation value to move the focus lens FL to the position or a mountain climbing method of moving the focus lens FL in a direction that the focus evaluation value increases and setting a focus lens group at the position when a point that the focus evaluation value starts to decrease is detected can be used as a control system of the focus lens FL based on the focus evaluation value.

In addition to the systems, a phase difference system may also be used as the control system of the focus lens FL. In phase difference AF processing, the focus lens FL in the interchangeable lens 300 is controlled so that a defocus amount obtained from phase difference data calculated by using a plurality of pixels with phase differences in a predetermined focus area in the image data becomes 0. When the phase difference system is used, an imaging element for phase difference AF may be separately installed, and a phase difference detected by the imaging element for phase difference AF may be used to perform AF.

An AE/AWB detection unit 229 imports the image signals of R, G, and B stored in the SDRAM 232, integrates G signals of the entire screen or integrates the G signals by applying different weights for a screen center section and a peripheral section, and outputs an integrated value necessary for the AE control to the main CPU 251. The main CPU 251 calculates a brightness value from the integrated value and obtains an exposure value from the brightness value. The diaphragm value and the shutter speed are also determined from the exposure value according to a predetermined program diagram.

The AE/AWB detection unit 229 also divides one screen into a plurality of areas (for example, 16×16) as a physical quantity necessary for the AWB control and calculates an average integrated value of each color of the image signal of R, G, and B for each of the divided areas. The main CPU 251 obtains ratios of R/G and B/G for each of the divided areas from the obtained integrated value of R, integrated value of B, and integrated value of G and determines a light source type based on a distribution of the obtained values of R/G and B/G in a color space of R/G and B/G and the like. In accordance with a white balance adjustment value suitable for the determined light source type, gain values (white balance correction values) of a white balance adjustment circuit for the R, G, and B signals are determined so that, for example, the value of each ratio becomes about 1 (therefore, integration ratio of RGB in one screen is R:G:B=1:1:1). The AE/AWB detection unit 229 applies the digital gains according to the light source type to the image signals of one frame stored in the SDRAM 232 to perform white balance adjustment and executes gamma (gradation characteristics) processing and sharpness processing to generate R, G, and B signals.

A compression/expansion processing unit 208 (image processing unit) applies predetermined compression processing to the image data generated by the digital signal processing unit 206 according to a command from the main CPU 251 to generate compressed image data. Predetermined expansion processing is applied to the compressed image data to generate uncompressed image data.

A media control unit 234 (image recording unit) records image data obtained by imaging in a memory card 236 (image recording unit) according to a command from the main CPU 251 and reads a recorded image from the memory card 236.

The display control unit 210 (display unit) controls display on the monitor 213 (display unit) and the liquid crystal plate 248 according to a command from the main CPU 251.

A finder control unit 238 drives the finder variable power lens 244 to load and unload the finder variable power lens 244 to and from the optical axis.

The liquid crystal shutter control unit 239 controls the light-blocking and non-light-blocking states of the liquid crystal shutter 243.

The camera main body 200 and the interchangeable lens 300 perform communication through a mount 256 and the mount communication unit 250 of the camera main body 200, the mount 346 and a mount communication unit 350 of the interchangeable lens 300, and terminals arranged on the mount 256 and the mount 346 and transmit and receive various commands, such as a lens moving command and an iris changing command, and responses of the commands. In addition, the camera main body 200 and the interchangeable lens 300 perform communication of various control statuses through a control status communication terminal.

<Functional Configuration of Main CPU 251>

In the imaging apparatus 100, a plurality of icons corresponding to each of various functions (for example, sensitivity setting function, pixel number setting function, image quality setting function, and the like) of the imaging apparatus 100 are arranged in a two dimensional matrix and displayed on the monitor 213. The display of the icons can be switched to perform setting of a parameter of each function (for example, setting of a value of ISO sensitivity in the sensitivity setting function) (described later). The icon display and the setting of the parameter are mainly performed by the control of the main CPU 251, and the main CPU 251 has the following functions to perform the control.

Figure 4:
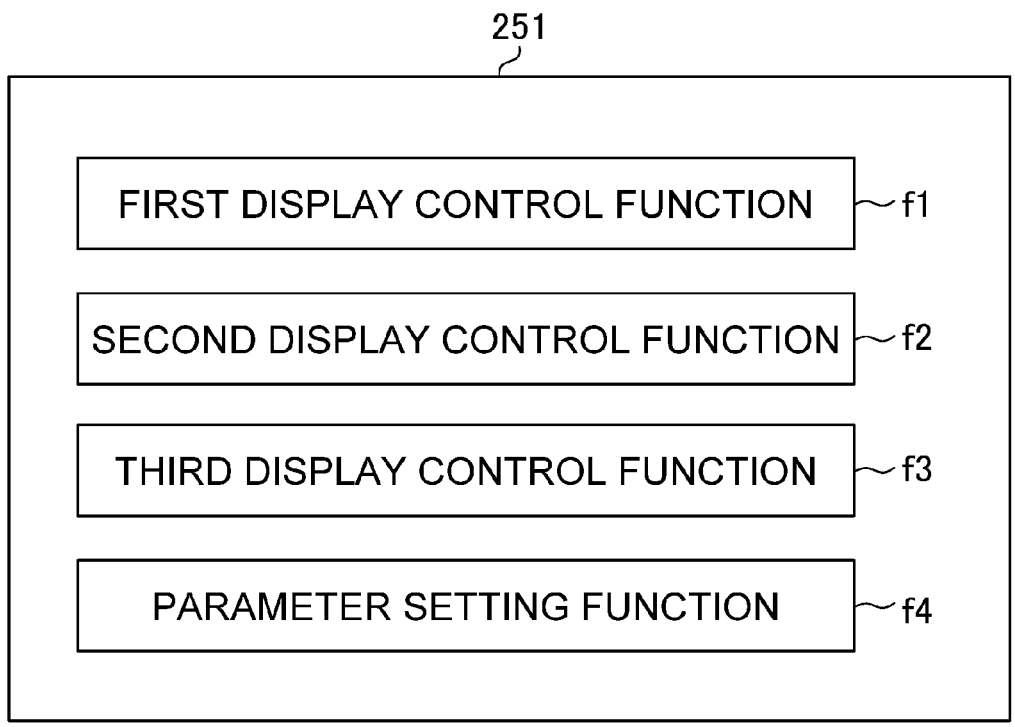
FIG. 4 is a diagram schematically showing functions of a main CPU 251.

FIG. 4 is a block diagram showing functions related to the icon display and the setting of the parameter among the functions of the main CPU 251, and the main CPU 251 has first to third display control functions f1 to f3 and a parameter setting function f4 as shown in FIG. 4. Hereinafter, a summary of each function will be described.

The first display control function f1 (first display control unit) is a function of displaying a list screen including a plurality of setting icons corresponding to each of a plurality of functions arranged in a two-dimensional matrix on the monitor 213 and displaying setting content of the parameters corresponding to the plurality of setting icons on each setting icon when any page of a plurality of pages is selected by pressing of the Q button 221 or operation through a page icon (described later).

The second display control function f2 (second display control unit) is a function in which when any setting icon is selected from the setting icons arranged in a two-dimensional matrix by the first display control function f1, the selected icon and the icons not selected are displayed in an identifiable manner.

The third display control function f3 (third display control unit) is a function in which when an instruction for parameter setting is input for a selected setting icon, the setting content of the input parameter is displayed on the selected setting icon, and when any page is selected by operation through a page icon, page information (whether the page allows custom setting by the user, a page number, and the like) of the selected page is displayed on the page icon.

The parameter setting function f4 (parameter setting unit) is a function of updating the setting of the parameter by the content currently displayed on the setting icon.

Details of the control based on the functions will be described later. The functions f1 to f4 are main functions related to the icon display and the setting of the parameter among the functions of the main CPU 251, and the functions of the main CPU 251 are not limited to the f1 to f4.

<Screen Display of Icons>

Figure 5:
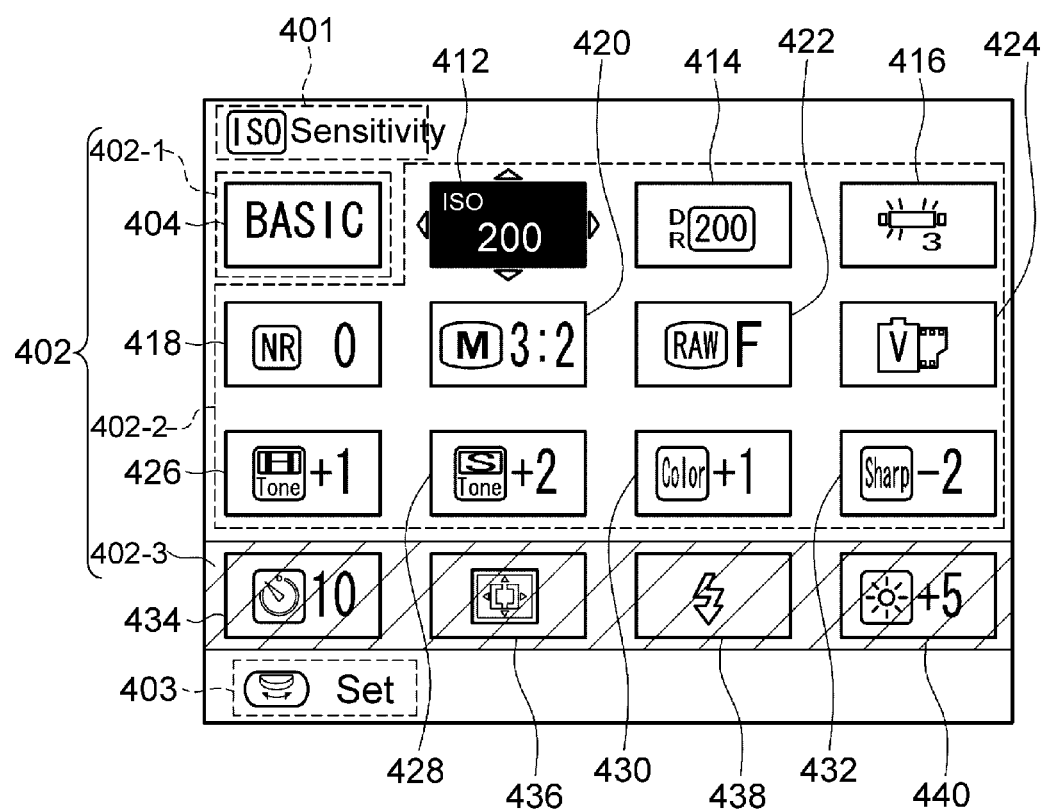
FIG. 5 is a diagram showing an example of an imaging condition setting screen in the imaging apparatus 100.

Next, screen display of icons will be described. FIG. 5 is a diagram showing an example of a state of displaying a page icon and setting icons arranged in a two-dimensional matrix on the monitor 213.

The screen shown in FIG. 5 is divided into a plurality of areas. The left side of the uppermost part of the screen is a first area 401 indicating character and symbol information indicating the content of a parameter that is set by the currently selected icon, and a character "Sensitivity" is displayed on the upper left of the screen because a sensitivity setting icon 412 is selected in the example of FIG. 5. The adjacent symbol is a symbol indicating that the sensitivity is ISO sensitivity. The display areas of individual icons are limited, and it may be difficult to display sufficient information for indicating the types of parameters. However, the character/symbol information indicating the content of the parameters is displayed on the screen in the imaging apparatus 100, and the content of parameters indicated by the icons can be easily figured out.

Below the first area 401 is a second area 402 displaying a plurality of icons arranged in a two-dimensional matrix. The second area 402 is further divided into three areas.

The first of the second area 402 is an area 402-1 which is an area on the upper left of the second area 402. Here, a page icon 404 is arranged (position is fixed). The display of the page icon 404 can be switched by rotation operation of the rotary dial 223. When the display is switched, one page corresponding to the switched display is selected, the first display control function f1 reads a plurality of parameters corresponding to the selected page from the flash ROM 231, the content of the parameter read for each setting icon is displayed, and the page information of the current list screen is displayed on the page icon 404. Although the area 402-1 is arranged on the upper left of the second area 402 in the example of FIG. 5, the area 402-1 may be arranged not only on the upper left, but also on any of the four corners of the second area 402, such as lower left, upper right, and lower right.

The second of the second area 402 is an area 402-2, and a plurality of individual setting icons (setting icons) designated by reference numerals 412 to 432 are displayed and arranged in a two-dimensional matrix here. These individual setting icons correspond to parameters in which different content can be set for each page. When operation of selecting each icon to switch the display of the icon is performed in a page in which custom setting is possible, the setting content of the parameter corresponding to the icon is changed (described later). In the example of FIG. 5, reference numerals 412 to 432 designate the sensitivity (ISO sensitivity) setting icon 412, a dynamic range (extent thereof) setting icon 414, a white balance (type of light source) setting icon 416, a noise reduction (strength of noise removal process) setting icon 418, an image size setting icon 420, an image quality mode (compression ratio of recording image) setting icon 422, a film simulation (change in coloring or gradation, color/monochrome, presence of filter, and the like of the image to be taken) setting icon 424, a highlight tone (degree of softening the tone of a highlight section of image) setting icon 426, a shadow tone (degree of softening the tone of a shadow section of image) setting icon 428, a color (density of color of image) setting icon 430, and a sharpness (degree of edge enhancement) setting icon 432.

The individual setting icons are arranged according to degrees of association between the parameters indicated by the icons. For example, in FIG. 5, the sensitivity setting icon 412 and the dynamic range setting icon 414, the image size setting icon 420 and the image quality mode setting icon 422, and the highlight tone setting icon 426 and the shadow tone setting icon 428 with high degrees of association are arranged side-by-side adjacent to each other, and the related parameters can be quickly and easily set.

The third of the second area 402 is an area 402-3, and a plurality of common setting icons (common icons) designated by reference numerals 434 to 440 are displayed together here. These common setting icons are icons for setting parameters with content common in eight pages. Like the individual setting icons, when operation of selecting each icon to switch the display of the icon is performed, the setting content of the parameter corresponding to the icon is changed (described later). In the example of FIG. 5, reference numerals 434 to 440 designate a self-timer (timer setting time) setting icon 434, an AF mode (selection method of AF area) setting icon 436, a flash mode (mandatory light emission, light emission prohibition, and the like) setting icon 438, and a brightness setting icon 440 of the monitor 213. The area 402-3 is displayed in a different color from the areas 402-1, 2, and the arrangement of the common setting icons can be easily identified.

The arrangement of the icons in the second area described above has the same arrangement pattern in all pages.

The left side of the lowest part of the screen is a third area 403 displaying information indicating operation for setting a parameter. In the example of FIG. 5, "Set" is displayed along with a symbol indicating a state of rotating the rotary dial 223, which indicates that the rotary dial 223 can be rotated to set the parameter (here, sensitivity) indicated by the currently selected icon (sensitivity setting icon 412 in the example of FIG. 5). In this way, in the imaging apparatus 100, the parameters can be easily set by displaying a screen of information indicating the operation for setting the parameters.

<Hierarchical Structure of Page>

Figure 6:
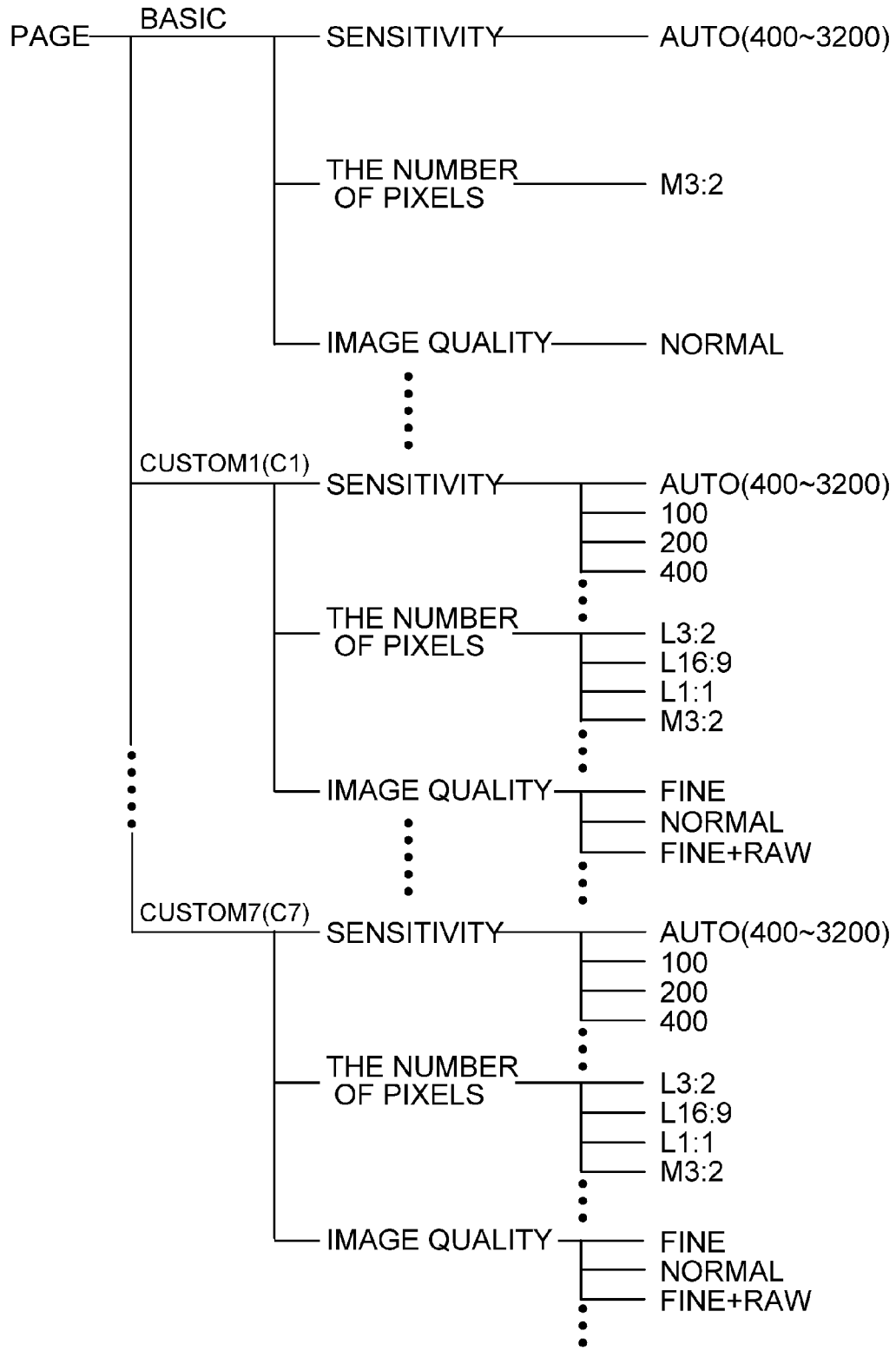
FIG. 6 is a diagram showing a hierarchical structure of a page and parameters included in the page.

FIG. 6 is a diagram showing an example of a hierarchical structure of a page. As described, the number of pages is eight in the imaging apparatus 100 according to the present embodiment, including one page in which the imaging apparatus 100 automatically sets the content of the parameters (displayed "BASIC" in the page icon 404) and seven pages in which the user of the imaging apparatus 100 can set each parameter ("C1" to "C7" in the display of the page icon 404). Cases in which the content of the parameters is "automatically set" include a case in which one fixed content is set and a case in which content selected from a plurality of values is set. The information indicating that the content of the parameters is automatically set in the page is expressed by "BASIC" in the display of the page icon 404 in the present embodiment.

Each page includes a set of a plurality of parameters for setting each of a plurality of functions of the imaging apparatus 100, and each of a plurality of individual setting icons corresponds to each of the plurality of functions. Although each individual setting icon is differently displayed by the first display control function f1 according to the setting content of the parameter corresponding to the icon, the arrangement of the icons has the same arrangement pattern in all pages.

The information of the hierarchical structure is recorded in the flash ROM 231.

The reason that there are parameters automatically set in the page of "BASIC" and parameters that are set in a fixed manner is that there are parameters, such as sensitivity and white balance, for which it is preferable to make a selection from a plurality of choices according to the imaging scene instead of setting the parameters in a fixed manner. "AUTO (automatic setting)" is provided for the setting content of the parameters in the custom setting pages in consideration of a case that the user wants to set only part of the parameters.

<Parameter Setting Process>

Figure 7:
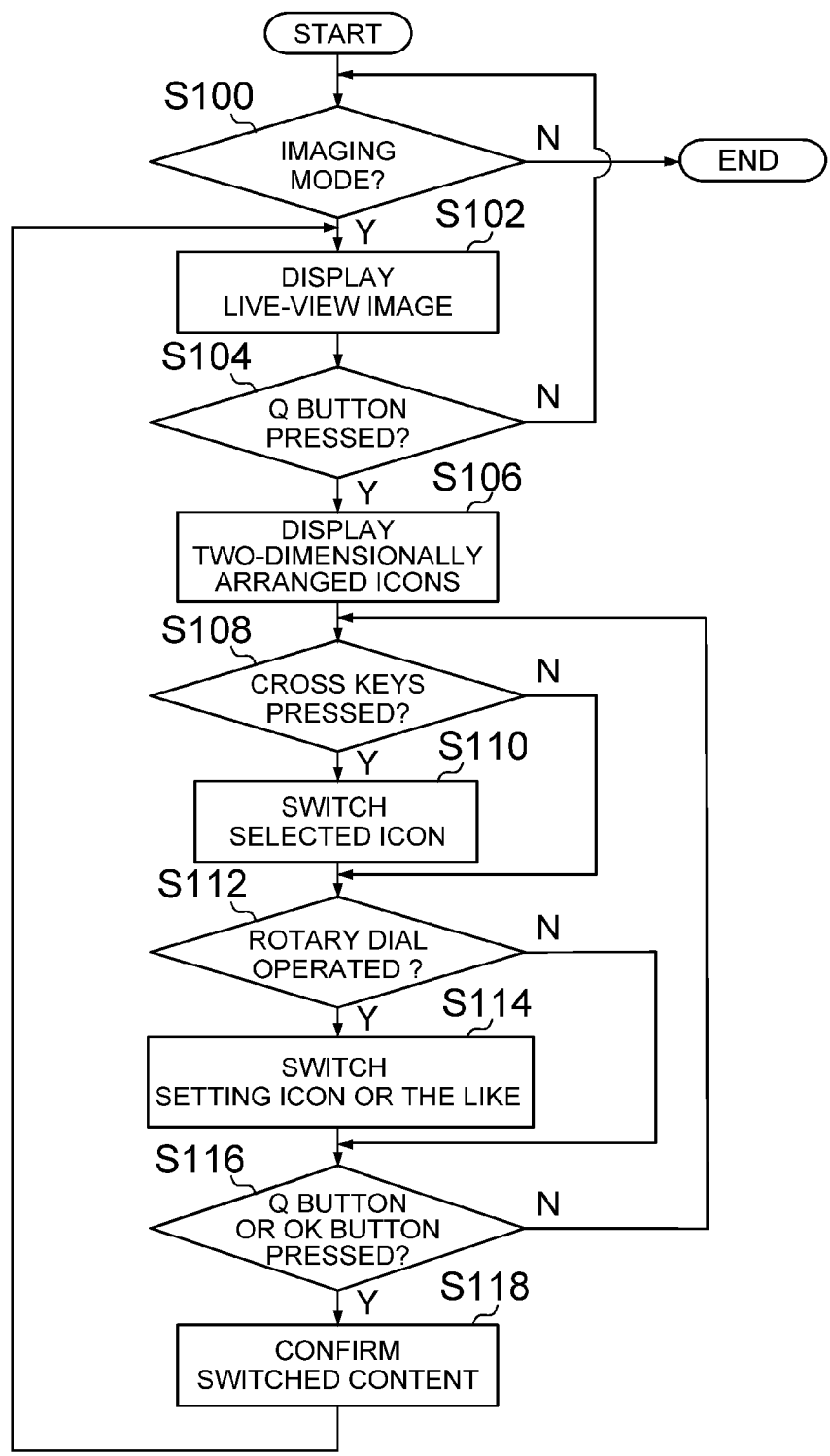
FIG. 7 is a flow chart showing a parameter setting process.

Next, a parameter setting process through individual setting icons and common setting icons will be specifically described. FIG. 7 is a flow chart showing a parameter setting process. If the imaging apparatus 100 is set to the imaging mode (Y in S100), a live-view image is displayed on the monitor 213 (S102). If the Q button 221 is pressed (Y in S104), the single page icon 404, the plurality of individual setting icons (reference numerals 412 to 432), and the plurality of common setting icons (434 to 440) are arranged in a two-dimensional matrix and listed and displayed on the monitor 213 by the first display control function f1 as in the example of FIG. 5 (S106: first display control step). In this case, each icon is displayed not to overlap with each other, and the lastly selected icon of the page lastly operated or displayed in the previous time is displayed in a selected state based on the update information recorded in the flash ROM 231. The selected icon is inverted and displayed by the second display control function f2, and a cursor (rectangle symbol and triangle symbols indicating vertical and horizontal directions arranged on four corners of the rectangle symbol in the example of FIG. 5) indicative of the selection is superimposed and displayed on the icon. The selected icon and the icons not selected are displayed in an identifiable manner (second display control step).

As described, if any of the up, down, left, and right keys of the cross keys 222 is pressed in a state that the icons are displayed on the monitor 213 (Y in S108), the cursor moves in the up, down, left, or right direction according to the pressed key, and the selected icon is switched (S110). If the cross keys 222 are not pressed (N in S108), the selection state of the icon continues.

In this way, if the rotary dial 223 is rotated and operated in the state that any icon is selected (Y in S112), the display of the selected icon is switched by the third display control function f3 according to the number of rotation operations (S114: third display content step). In this case, the third display control function f3 sequentially switches the display (page information) of the page icon 404 in a range of "BASIC" and "C1" to "C7" if the selected icon is the page icon 404 and sequentially switches the content of the parameter displayed on the icon according to the number of rotation operations if the selected icon is an individual setting icon or a common setting icon. A rotation of a predetermined angle of the rotary dial 223 may be assumed as one operation, and switching according to the rotation angle may be performed. If the rotary dial 223 is not rotated and operated even once (N in S112), the icon display is not switched (S114 is skipped).

If the Q button 221 or the MENU/OK key 224 is pressed in the state that the process up to S112 or S114 is executed (Y in S116), the parameter setting function f4 updates the setting content of the parameter corresponding to the currently selected page based on the setting content of the parameter displayed on the monitor 213 (S118: parameter setting step), and the live-view image display state (S102) is restored.

In this way, the parameters are set in a state that not only the selected icon, but also all icons included in one page are listed and displayed in the imaging apparatus 100 according to the present embodiment. There is no transition to another screen in the parameter setting, and the display of the icons other than the setting target is not hidden. Therefore, one parameter can be set while checking the setting content of all of the other parameters at the same time, and appropriate setting can be performed by minimum operation even when an imaging condition is changed.

<Screen Display in Parameter Setting Process>

Figure 8:
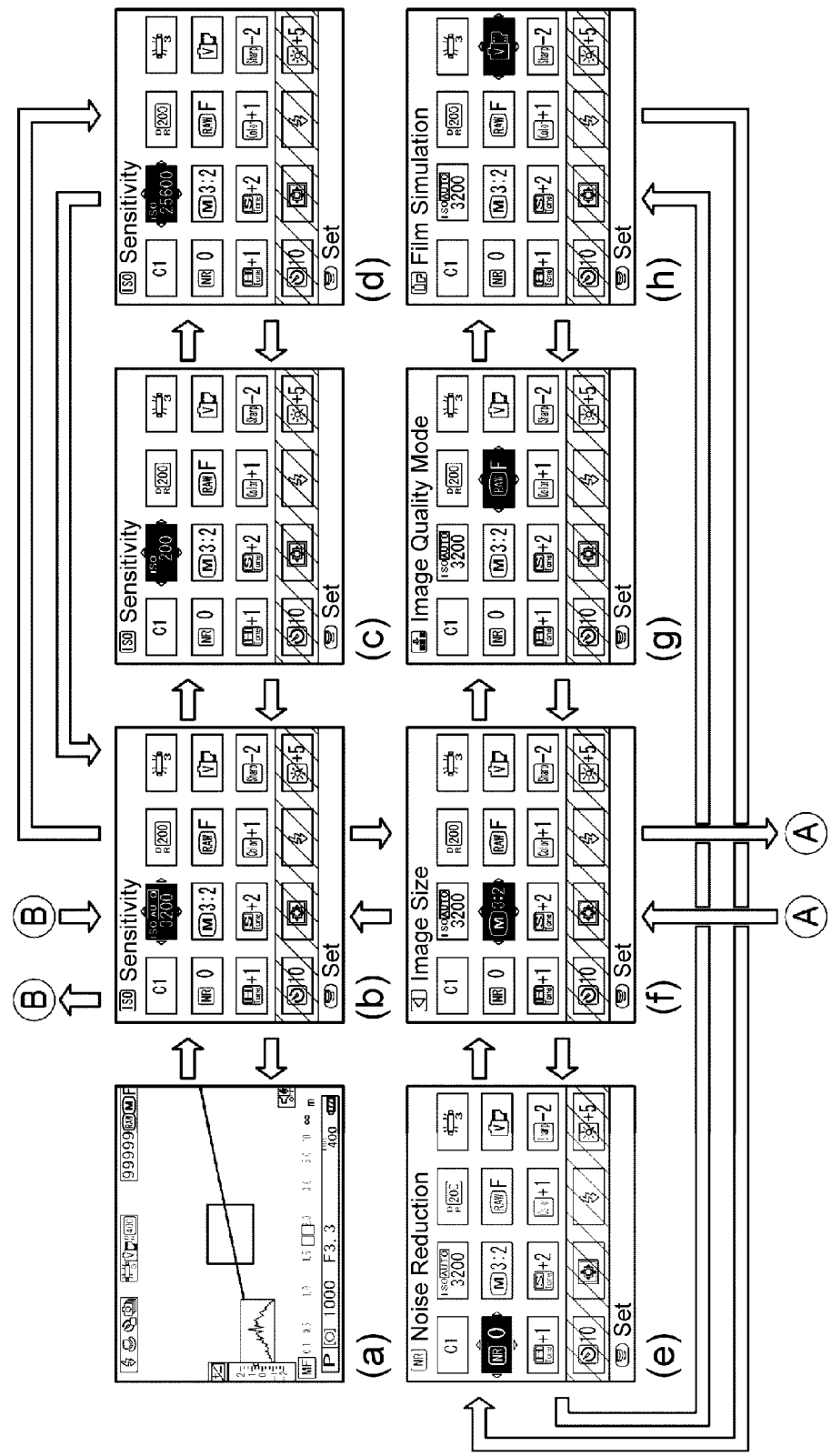
FIG. 8 is a diagram showing examples of screen display in the parameter setting process.
Figure 9:
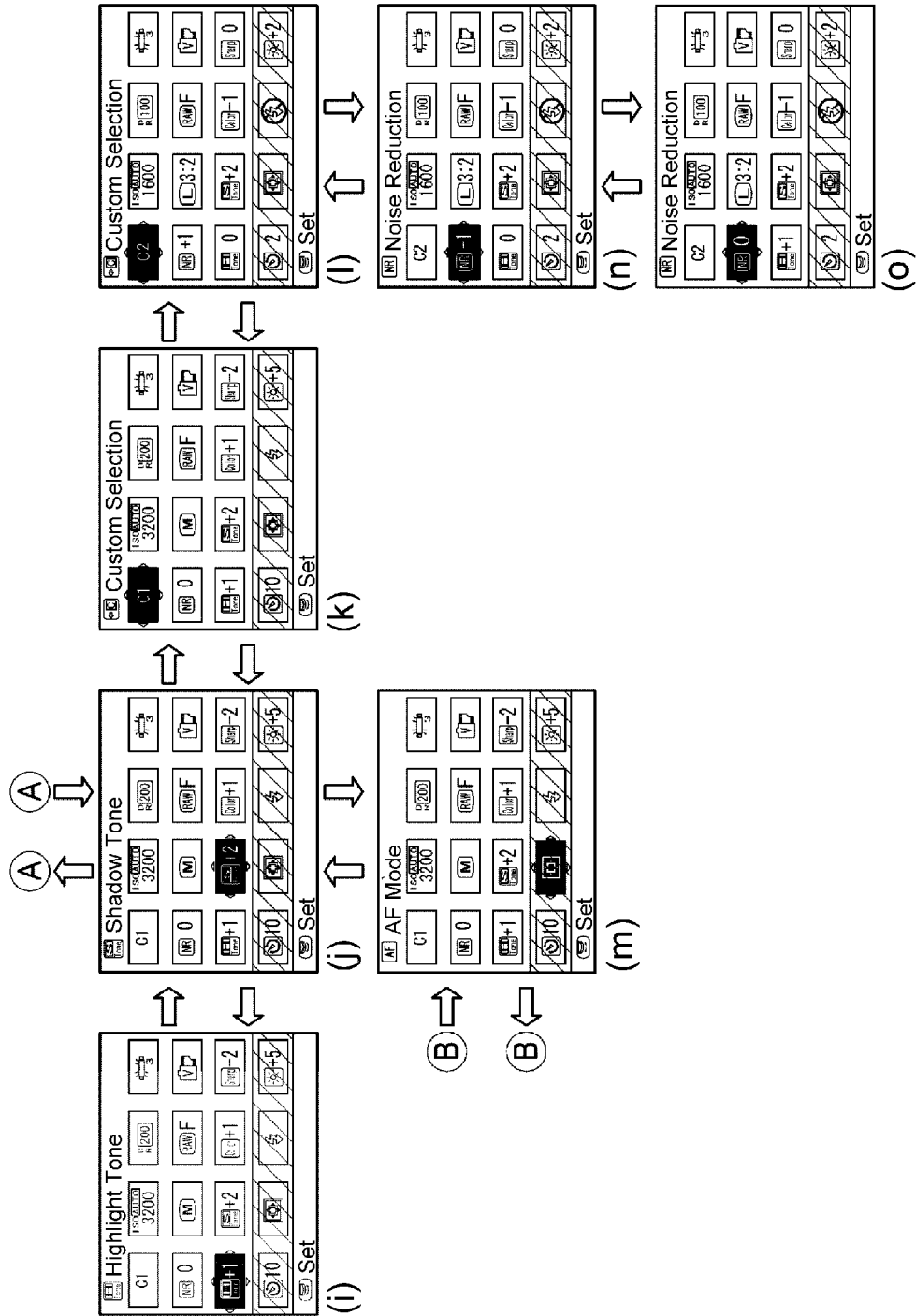
FIG. 9 is another diagram showing examples of screen display in the parameter setting process.

Next, a state of the screen display when the parameter setting process is executed will be described. FIG. 8 and FIG. 9 are diagrams showing examples of the screen display, and the screen display changes in directions of arrows. FIG. 8 and FIG. 9 are continuous at parts of symbols with A and B written in circles.

The (a) portion of FIG. 8 is a display example of the monitor 213 when the imaging apparatus 100 is set to the imaging mode (corresponding to S100 in the flow chart of FIG. 7, the same applies hereinafter), and a live-view image (not shown) and various imaging information are displayed (S102). If the Q button 221 is pressed in this state (Y in S104), the screen display is changed as in the (b) portion of FIG. 8 (S106). In the imaging apparatus 100, the icon is displayed in the state that the icon lastly selected in the page lastly operated or displayed in the previous time is selected as described above, and the (b) portion of FIG. 8 shows an example of a state that the sensitivity setting icon 412 of the custom page 1 (C1), for which the parameter is lastly set in the previous time, is selected, inverted, and displayed.

If the rotary dial 223 is rotated and operated in the state of the (b) portion of FIG. 8 (Y in S112), the display of the sensitivity setting icon 412 is switched according to the number of rotation operations (S114). The (c) portion of FIG. 8 is a state in which the sensitivity display is switched to ISO 200, and the (d) portion of FIG. 8 is a state in which the sensitivity display is switched to ISO 25600.

Meanwhile, if any of the up, down, left, and right keys of the cross keys 222 is pressed in the state of the (b) portion of FIG. 8 (S108), the cursor moves according to the press (S110), and another icon is selected as in the (f) portion of FIG. 8. The (f) portion of FIG. 8 is a state in which the image size setting icon 420 is selected. If the left and right keys of the cross keys 222 are operated in this state (S112), the cursor moves as in the (e), (g), and (h) portions of FIG. 8, and another icon is selected.

If the downward key of the cross keys 222 is pressed in the state of the (f) portion of FIG. 8 (state that the image size setting icon 420 is selected), the shadow tone setting icon 428 is selected as in the (j) portion of FIG. 9. If the rightward key of the cross keys 222 is pressed and the upward key is pressed (twice) in the state of the (j) portion of FIG. 9, the cursor moves, and the page icon 404 is selected as in the (k) portion of FIG. 9. If the leftward key of the cross keys 222 is pressed in the state of the (j) portion of FIG. 9, the cursor moves, and the highlight tone setting icon 426 is selected as in the (i) portion of FIG. 9.

If the rotary dial 223 is rotated and operated in the state of the (k) portion of FIG. 9, the display of the page icon 404 is switched to display indicating another page according to the number of rotation operations, and the display of the individual setting icons is switched according to the page display. The (l) portion of FIG. 9 shows a state in which the custom page 2 (C2) is selected, and the display of the individual setting icons is switched according to the setting in the custom page 2. The (n) and (o) portions of FIG. 9 show a state in which the cursor is moved in the custom page 2, and the icon to be selected is changed accordingly.

The description so far is about the selection and switch of the page icon 404 and the individual setting icons. If the downward key of the cross keys 222 is pressed in the state of the (j) portion of FIG. 9, the cursor moves, and the AF mode setting icon 436 is selected as in the (m) portion of FIG. 9. If the rotary dial 223 is rotated and operated in this state, the display state of the AF mode setting icon 436 is changed as in the case of the page icon 404 and the individual setting icons.

If the Q button 221 or the MENU/OK key 224 is pressed in the state of the (b) to (h) portions of FIG. 8 and the (i) to (o) portions of FIG. 9, the setting content of the parameters corresponding to the page selected at the time of the press of the buttons is updated based on the setting content of the parameters displayed on the monitor 213, and the live-view image display state of the (a) portion of FIG. 8 is restored. If the DISP/BACK button 225 is pressed, the live-view image display state is restored without updating the setting content of the parameters. When the setting content of the parameters is updated, the storage content of the flash ROM 231 is also updated.

[Error Processing]

Next, error processing during various parameter settings by using the setting icons will be described.

Figure 10:
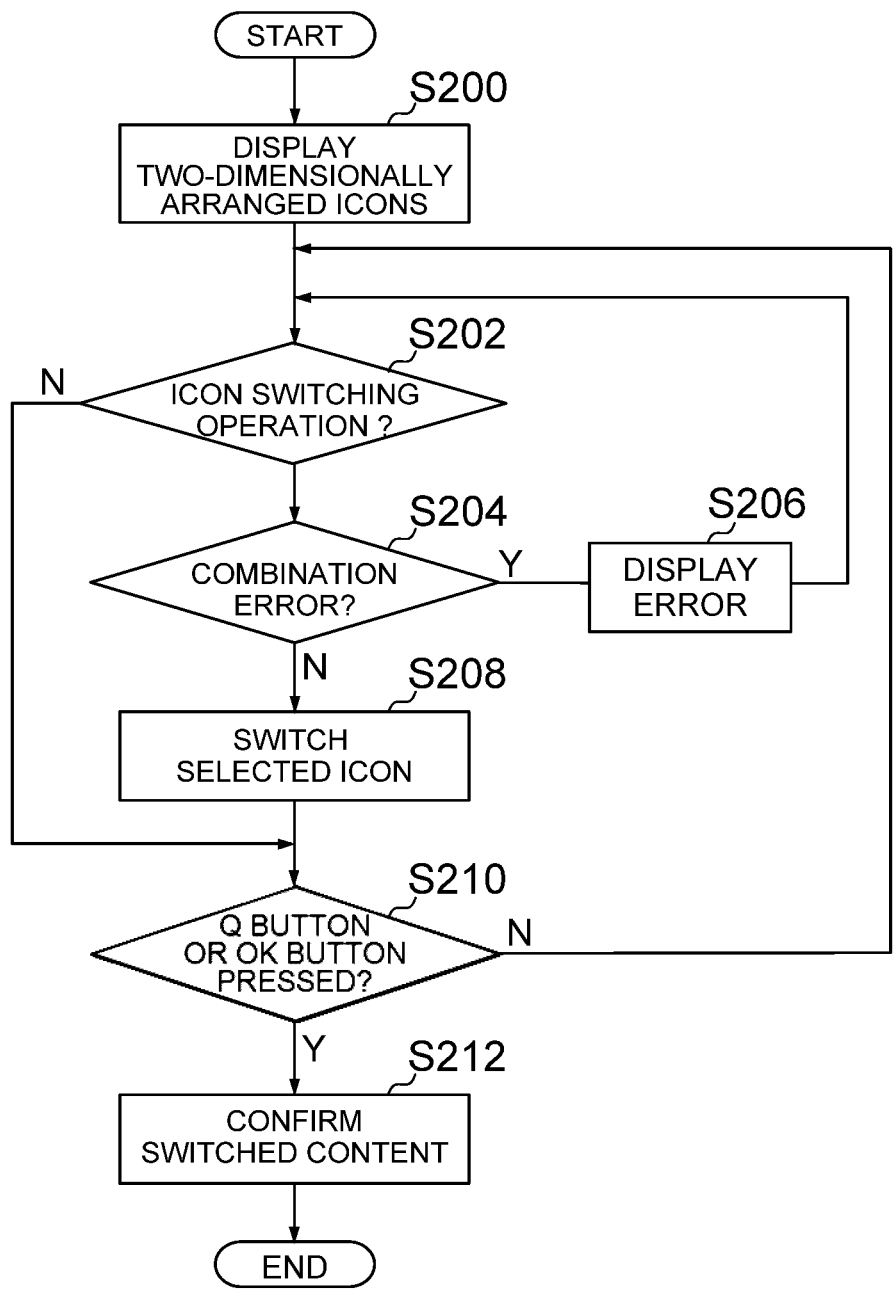
FIG. 10 is a diagram showing error processing in the parameter setting process.

FIG. 10 is a flow chart showing processing operation including error processing during parameter setting by the main CPU 251.

In FIG. 10, when a plurality of individual setting icons and the like are two-dimensionally arranged and displayed on the monitor 213 as in the example of FIG. 5, and a desired icon (icon subject to parameter setting) is selected on the list screen, the parameter of the function corresponding to the selected icon can be set (S200).

Subsequently, whether the switching operation (rotation operation by the rotary dial 223) of the selected icon is performed is determined (S202). If the operation is not performed, the process moves to step S210. If the operation is performed, the process moves to step S204.

In step S204, whether the setting content of the parameter switched along with the icon display by the switching operation in step S202 is content that can be set at the same time as the setting content of the parameter that is set in association with another setting icon (whether combination error occurs) is determined.

For example, if a high ISO sensitivity (ISO 1600 or more) is set by the sensitivity setting icon 412, and a process of increasing the sensitivity by pixel addition (pixel mixing) is to be carried out, the size of the image that can be taken is limited, and the image in the maximum image size cannot be taken and recorded. Therefore, in a case in which the selected individual setting icon is the image size setting icon 420, and ISO 1600 or more is set by the sensitivity setting icon 412, if the setting content of the parameter in the image size setting icon 420 corresponds to the maximum image size, the combination of both characters cannot be set at the same time, and a combination error occurs.

Figure 11:
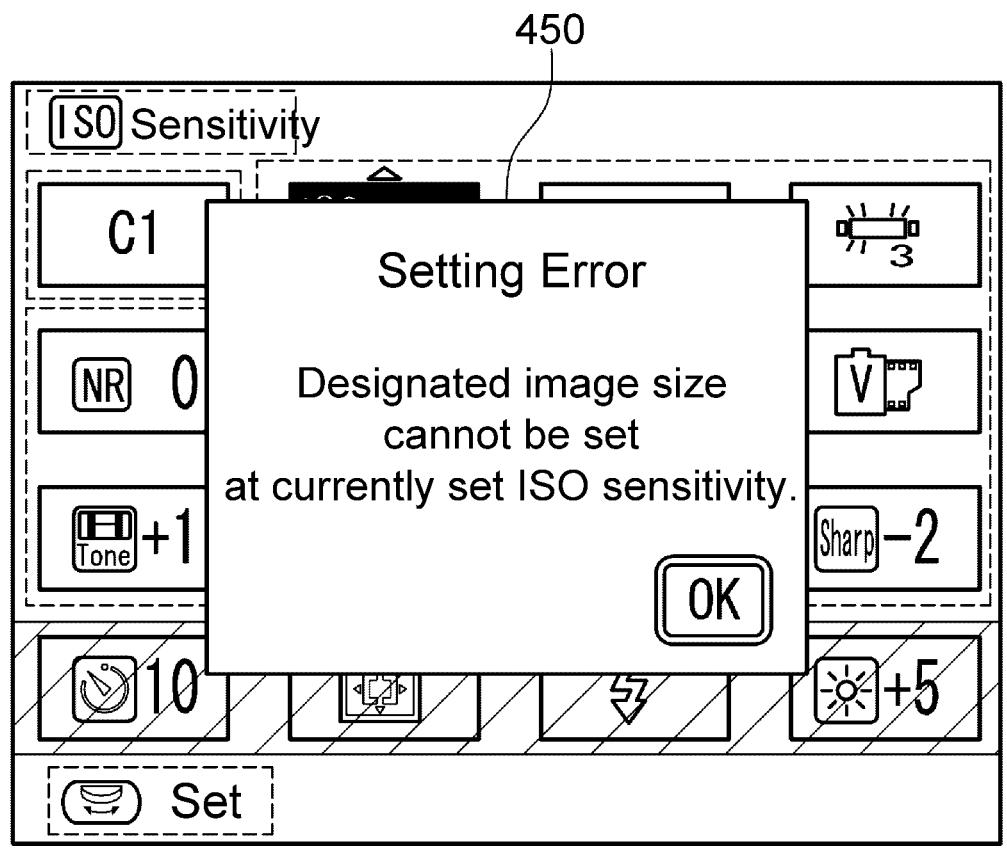
FIG. 11 is a diagram showing a screen example when an error occurs in the parameter setting process.

In step S204, if a combination error is determined, the process moves to step S206, and error display is performed. For example, in the case of the combination error of the example, an error message 450 is displayed on the list screen as shown in FIG. 11 to notify the user of the error in the setting.

On the other hand, if a combination error is not determined in step S204, the process moves to step S208, and another setting icon can be selected (switched) by the operation of the cross keys 222.

Subsequently, whether the Q button 221 or the MENU/OK key 224 is pressed is determined (S210). If not pressed, the process moves to step S202. If pressed, the process moves to step S212. In step S212, the setting content using the setting icon is confirmed, and the content (parameter) of the page corresponding to the current list screen of the flash ROM 231 is updated.

If icon switching operation that causes a combination error of parameter setting is input, the icon display may not be switched (may not be able to be set), or the error message may be displayed (notified) by warning sound or voice instead of displaying the error message by characters.

[Highlight of Icon]

The imaging apparatus 100 of this embodiment has a highlight function for automatically highlighting the plurality of icons tow-dimensionally arranged and displayed on the monitor 213 according to the update information.

Figure 12:
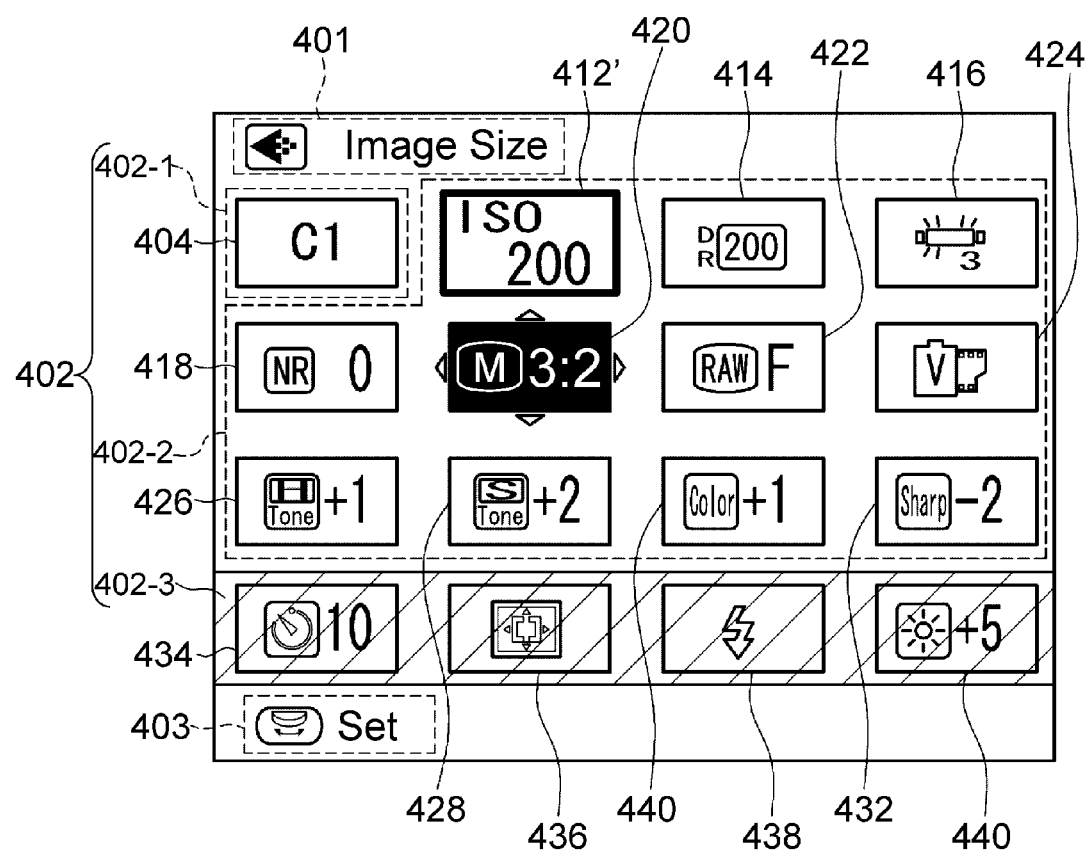
FIG. 12 is a diagram showing an example of a highlight of an icon according to a setting frequency of parameter.

The highlight function includes, as shown in FIG. 12: the flash ROM 231 that records update information (such as frequency of update and update history) of each parameter corresponding to the individual setting icons and the like; and a display control function (first display control unit) for changing (changing the highlight degree) of the display mode of each setting icon based on the update information recorded in the flash ROM 231.

When the setting content of the parameter corresponding to each setting icon is updated, the main CPU 251 records the frequency of update (number of updates) of the parameter in the flash ROM 231 in association with each setting icon.

When the list of each setting icon is displayed on the monitor 213, the display control function of the main CPU 251 highlights the setting icon corresponding to the parameter with a high frequency of update, compared to the other setting icons, according to the frequency of update of each setting icon recorded in the flash ROM 231.

In the example shown in FIG. 12, highlighting is performed so that the thickness of the characters and the frame of a sensitivity setting icon 412' is thicker than the thickness of the characters and the frames of the other setting icons.

This can improve the search performance of setting items of the user. The highlight here is not limited to the thickness of the characters and the like, and the highlight may be based on the size of icon, the saturation, the level of contrast, or the like.

The highlighted icon is not limited only to the icon with the highest frequency of update, and for example, the level of highlight may be changed and displayed for each of classifications of large, medium, and small frequencies of update of each icon. Furthermore, the icon corresponding to the same parameter as the parameter updated last time may be highlighted based not only on the frequency of update of parameter, but also on the update history of parameter, for example.

Second Embodiment

Although the imaging apparatus (digital camera) 100 has been described as an embodiment of the portable electronic device according to the present invention, the configuration of the portable electronic device is not limited to this. An example of another portable electronic device of the present invention includes a built-in or external PC camera or a portable terminal apparatus with imaging function as described below.

Examples of the portable terminal apparatus as a second embodiment of the portable electronic device according to the present invention includes a portable phone, a smartphone, a PDA (Personal Digital Assistants), and a portable gaming device. Hereinafter, an example of the smartphone will be described in detail with reference to the drawings.

<Configuration of Smartphone>

Figure 13:
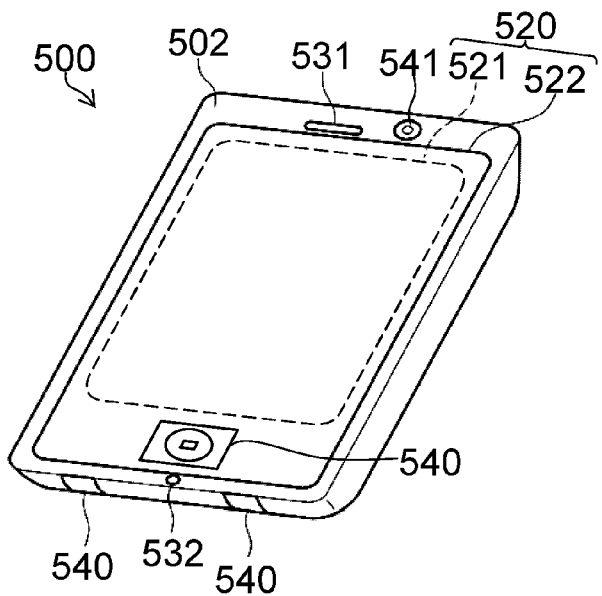
FIG. 13 is an external view of a smartphone 500 according to a second embodiment of the present invention.

FIG. 13 shows an appearance of a smartphone 500 as another embodiment of the portable electronic device according to the present invention. The smartphone 500 shown in FIG. 13 includes: a planar housing 502; and a display input unit 520 in which a display panel 521 as a display unit and an operation panel 522 as an input unit are integrated on one of the surfaces of the housing 502. The housing 502 includes a speaker 531, a microphone 532, an operation unit 540, and a camera unit 541. The configuration of the housing 502 is not limited to this. For example, a configuration in which the display unit and the input unit are independent can be adopted, or a configuration including a folding structure or a slide mechanism can be adopted.

Figure 14:
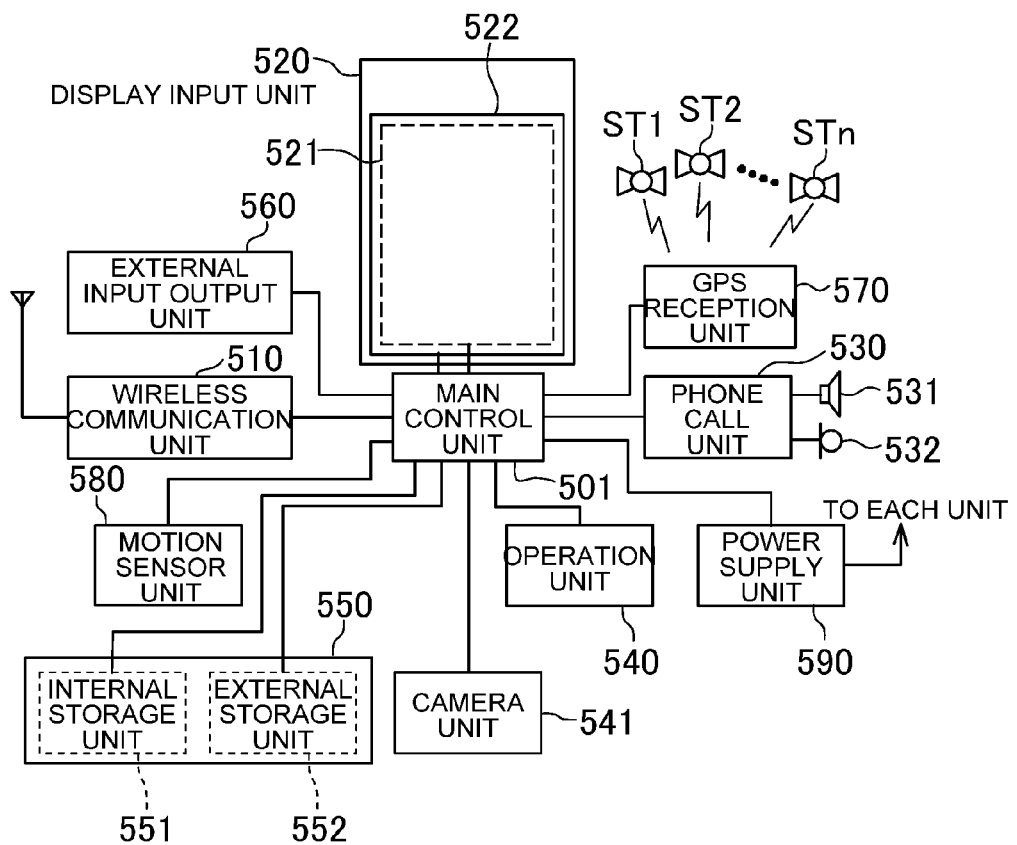
FIG. 14 is a block diagram showing a configuration of main parts of the smartphone 500.

FIG. 14 is a block diagram showing a configuration of the smartphone 500 shown in FIG. 13. As shown in FIG. 14, main constituent elements of the smartphone include a wireless communication unit 510, the display input unit 520, a phone call unit 530, the operation unit 540, the camera unit 541, a storage unit 550, an external input-output unit 560, a GPS (Global Positioning System) reception unit 570, a motion sensor unit 580, a power supply unit 590, and a main control unit 501. Main functions of the smartphone 500 include a wireless communication function for performing mobile wireless communication through a base station apparatus and a mobile communication network.

The wireless communication unit 510 performs wireless communication with the base station apparatus housed in the mobile communication network according to an instruction of the main control unit 501. The wireless communication is used to transmit and receive voice data, various file data such as image data, electronic mail data, and the like and to receive Web data, streaming data, and the like.

The display input unit 520 includes: the display panel 521 that is a so-called touch panel for displaying images (still images and moving images), character information, and the like to visually transmit information to the user and for detecting user operation for the displayed information based on the control of the main control unit 501; and the operation panel 522.

The display panel 521 is a panel in which an LCD (Liquid Crystal Display), an OELD (Organic Electro-Luminescence Display), or the like is used as a display device. The operation panel 522 is a device that is provided with images displayed on the display surface of the display panel 521 in a visually recognizable manner and that detects one or a plurality of coordinates operated by a finger of the user or a stylus. When the device is operated by a finger of the user or a stylus, a detection signal generated by the operation is output to the main control unit 501. Next, the main control unit 501 detects an operation position (coordinates) on the display panel 521 based on the received detection signal.

As shown in FIG. 13, the display panel 521 and the operation panel 522 of the smartphone 500 are integrated to form the display input unit 520, and the operation panel 522 is arranged to completely cover the display panel 521. When this arrangement is adopted, the operation panel 522 may have a function of detecting user operation for an area outside of the display panel 521. In other words, the operation panel 522 may include a detection area (hereinafter, called display area) for a superimposed part overlapping with the display panel 521 and a detection area (hereinafter, called non-display area) for a peripheral part other than the detection area not overlapping with the display panel 521.

Although the size of the display area and the size of the display panel 521 may completely match, the sizes may not match. The operation panel 522 may include two sensitive areas, a peripheral part and an inside part other than the peripheral part. Furthermore, the width of the peripheral part is appropriately designed according to the size of the housing 502 or the like. Furthermore, examples of the position detection system adopted in the operation panel 522 include a matrix switch system, a resistive film system, a surface acoustic wave system, an infrared system, an electromagnetic induction system, and an electrostatic capacitance system, and any system can be adopted.

The phone call unit 530 includes the speaker 531 and the microphone 532 and is configured to convert voice of the user input through the microphone 532 to voice data that can be processed by the main control unit 501 to output the voice data to the main control unit 501 and to decode voice data received by the wireless communication unit 510 or the external input-output unit 560 to output the voice data from the speaker 531. As shown in FIG. 13, for example, the speaker 531 can be mounted on the same surface as the surface provided with the display input unit 520, and the microphone 532 can be mounted on the side surface of the housing 502.

The operation unit 540 is a hardware key using a key switch or the like and is configured to receive an instruction from the user. For example, as shown in FIG. 13, the operation unit 540 is mounted on the lower part and the lower surface of the display unit of the housing 502 of the smartphone 1. The operation unit 540 is a push-button type switch that is turned on when pressed by a finger or the like and that enters an off state due to restoring force of a spring or the like when the finger is detached.

The storage unit 550 stores a control program and control data of the main control unit 501, application software, address data associating the name, phone number, and the like of the communication partner, data of transmitted and received electronic mail, Web data downloaded by Web browsing, and downloaded content data and also temporarily stores streaming data and the like. The storage unit 550 includes an internal storage unit 551 embedded in the smartphone and an external storage unit 552 including a removal external memory slot. The internal storage unit 551 and the external storage unit 552 included in the storage unit 550 are realized by using storage media, such as a flash memory type (flash memory type), a hard disk type (hard disk type), a multimedia card micro type (multimedia card micro type), a card-type memory (for example, Micro SD (registered trademark) memory or the like), a RAM (Random Access Memory), and a ROM (Read Only Memory).

The external input-output unit 560 serves as an interface with all external devices connected to the smartphone 500 and is for direct or indirect connection with another external device through communication or the like (for example, universal serial bus (USB), IEEE 1394, or the like) or through a network (for example, Internet, wireless LAN, Bluetooth (Bluetooth) (registered trademark), RFID (Radio Frequency Identification), infrared communication (Infrared Data Association: IrDA), (registered trademark), UWB (Ultra Wideband) (registered trademark), ZigBee (ZigBee) (registered trademark), or the like).

Examples of the external devices connected to the smartphone 500 include a wired/wireless head set, a wired/wireless external charger, a wired/wireless data port, a memory card (Memory card) or a SIM (Subscriber Identity Module Card)/UIM (User Identify Module Card) card connected through a card socket, an external audio video device connected through an audio video I/O (Input/Output) terminal, a wirelessly connected external audio video device, a smartphone for wired/wireless connection, a personal computer for wired/wireless connection, a PDA for wired/wireless connection, a personal computer for wired/wireless connection, an earphone, and the like. The external input-output unit can transmit data transmitted from the external devices to each constituent element inside of the smartphone 500 and can transmit data inside of the smartphone 500 to the external devices.

The GPS reception unit 570 receives GPS signals transmitted from GPS satellites ST1 to STn according to an instruction of the main control unit 501 and executes positioning arithmetic processing based on the plurality of received GPS signals to detect the position including latitude, longitude, and altitude of the smartphone 500. When position information can be acquired from the wireless communication unit 510 or the external input-output unit 560 (for, example, wireless LAN), the GPS reception unit 570 can also use the position information to detect the position.

The motion sensor unit 580 includes, for example, a triaxial acceleration sensor or the like and detects physical motion of the smartphone 500 according to an instruction of the main control unit 501. The movement direction and the acceleration of the smartphone 500 are detected by the detection of the physical motion of the smartphone 500. The detection result is output to the main control unit 501.

The power supply unit 590 supplies power stored in a battery (not shown) to each unit of the smartphone 500 according to an instruction of the main control unit 501.

The main control unit 501 includes a microprocessor and is configured to operate according to a control program or control data stored in the storage unit 550 to comprehensively control each unit of the smartphone 500. The main control unit 501 has a mobile communication control function and an application processing function for controlling each unit of the communication system in order to perform voice communication and data communication through the wireless communication unit 510.

The application processing function is realized by the operation of the main control unit 501 according to application software stored in the storage unit 550. Examples of the application processing function include an infrared communication function of controlling the external input-output unit 560 to perform data communication with an opposing device, an electronic mail function of transmitting and receiving electronic mail, and a Web browsing function of browsing a Web page.

The main control unit 501 also has an image processing function such as for displaying images on the display input unit 520 based on image data (data of still images and moving images) such as received data and downloaded streaming data. The image processing function denotes a function by the main control unit 501 decoding the image data and applying image processing to the decoding result to display images on the display input unit 20.

The main control unit 501 further executes display control for the display panel 521 and operation detection control for detecting user operation through the operation unit 540 and the operation panel 522.

Through the execution of the display control, the main control unit 501 displays an icon for activating the application software and a software key such as a scroll bar or displays a window for creating electronic mail. The scroll bar denotes a software key for receiving an instruction for moving the display part of an image, for a large image or the like that does not fall within the display area of the display panel 521.

Through the execution of the operation detection control, the main control unit 501 detects the user operation through the operation unit 540, receives operation for the icon or input of a character string in an input field of the window through the operation panel 522, or receives a scroll instruction of a display image through the scroll bar.

Through the execution of the operation detection control, the main control unit 501 further has a touch panel control function of determining whether the position of operation for the operation panel 522 is a superimposed part (display area) overlapping with the display panel 521 or a peripheral part (non-display area) other than the superimposed part not overlapping with the display panel 521 and controlling the sensitive area of the operation panel 522 and the display position of the software key.

The main control unit 501 can also detect gesture operation for the operation panel 522 to execute a function set in advance according to the detected gesture operation. The gesture operation does not denote conventional simple touch operation, but denotes operation for depicting a trajectory by a finger or the like, designating a plurality of positions at the same time, or combining these to depict a trajectory for at least one of the plurality of positions.

The camera unit 541 is a digital camera that uses an imaging element, such as a CMOS (Complementary Metal Oxide Semiconductor) and a CCD (Charge-Coupled Device), to perform electronic imaging. Through the control of the main control unit 501, the camera unit 541 can convert image data obtained by imaging to compressed image data, such as JPEG (Joint Photographic coding Experts Group), to record the data in the storage unit 550 or to output the data through the input-output unit 560 or the wireless communication unit 510. Although the camera unit 541 is mounted on the same surface as the display input unit 520 in the smartphone 500 shown in FIG. 13, the mounting position of the camera unit 541 is not limited to this. The camera unit 541 may be mounted on the back surface of the display input unit 520, or a plurality of camera units 541 may be mounted. When a plurality of camera units 541 are mounted, the camera unit 541 used for imaging can be switched for individual imaging, or a plurality of camera units 541 can be used at the same time for imaging.

The camera unit 541 can also be used for various functions of the smartphone 500. For example, an image acquired by the camera unit 541 can be displayed on the display panel 521, or an image of the camera unit 541 can be used as one of the operation inputs of the operation panel 522. When the GPS reception unit 570 detects a position, an image from the camera unit 541 can be referenced to detect the position. Furthermore, an image from the camera unit 541 can be referenced without using the triaxial acceleration sensor, or the image can be used along with the triaxial acceleration sensor, to determine the optical axis direction of the camera unit 541 of the smartphone 500 or to determine the current use environment. Obviously, an image from the camera unit 541 can also be used in the application software.

In addition, position information acquired by the GPS reception unit 570, voice information acquired by the microphone 532 (may be text information obtained by voice text conversion by the main control unit or the like), posture information acquired by the motion sensor unit 580, or the like can be added to image data of still images or moving images to record the data in the storage unit 550, or the data can be output through the external input-output unit 560 or the wireless communication unit 510.

Figure 15:
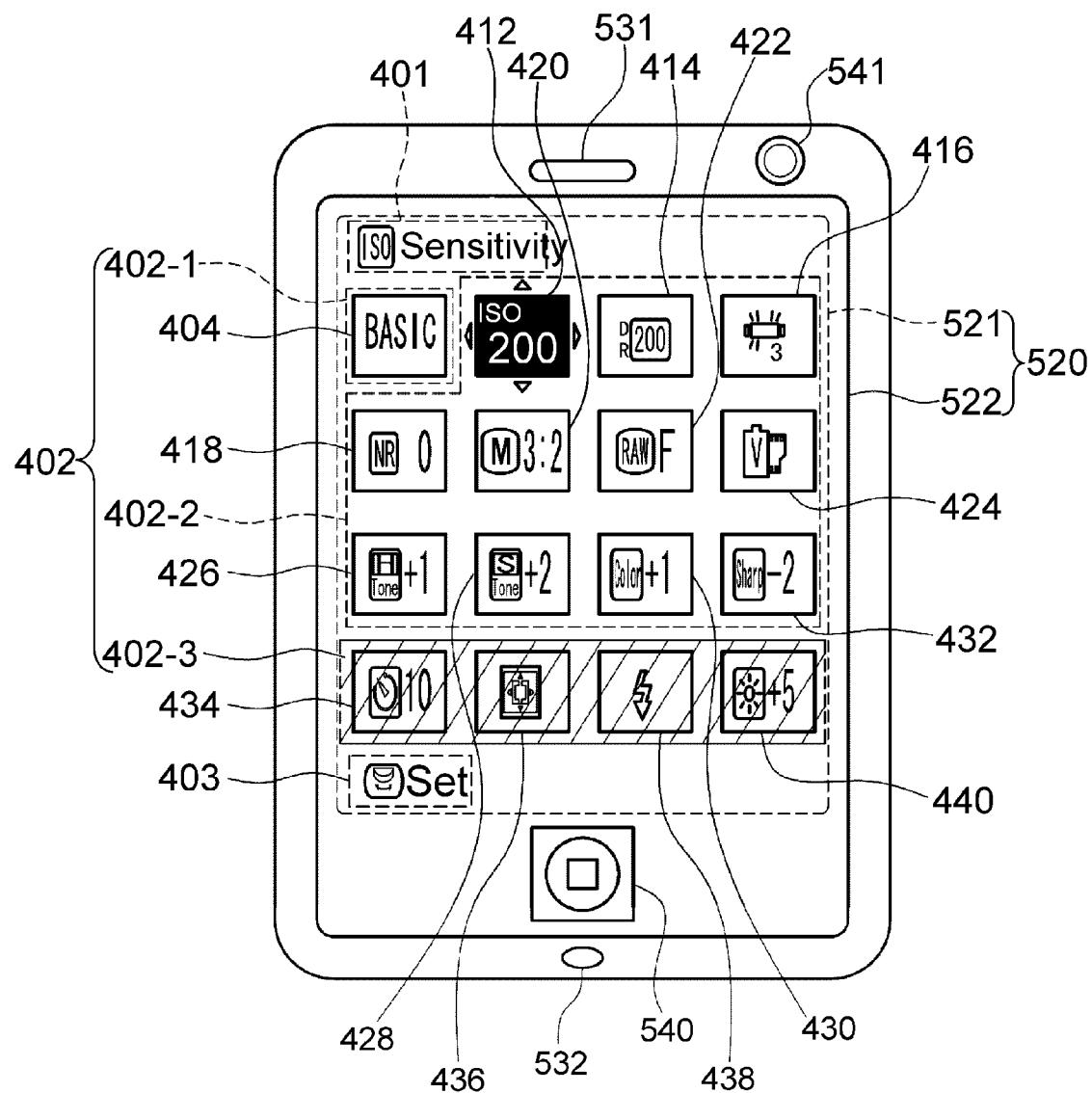
FIG. 15 is a diagram showing an example of an imaging condition setting screen in the smartphone 500.

FIG. 15 is a plan view of the smartphone 500 with the configuration, particularly illustrating a case in which a list screen similar to the screen of the imaging menu (list screen in which a plurality of icons are two-dimensionally arranged) shown in FIG. 5 is displayed.

The display of the list screen can be displayed by, for example, selecting the camera function on an initial screen (not shown) of the smartphone 500 and then pushing the operation unit 540 once. The operation unit 540 in this case plays the same role as the Q button 221.

An icon can be selected on the list screen by touching an area corresponding to the icon to be selected in the operation panel 522. After a desired setting icon is selected, if there is a touch input of touching again the area of the operation panel 522 corresponding to the setting icon, the main control unit 501 sequentially switches the display of the setting icon to the setting content of other parameters.

In this way, when the operation unit 540 is pressed after the parameter of each function corresponding to each setting icon is set, the setting content using the setting icon is confirmed, and the display of the display panel 521 returns from the list screen of the menu to the screen corresponding to the camera function (for example, screen displaying the live-view image).

<Another Configuration of Smartphone>

Figure 16:
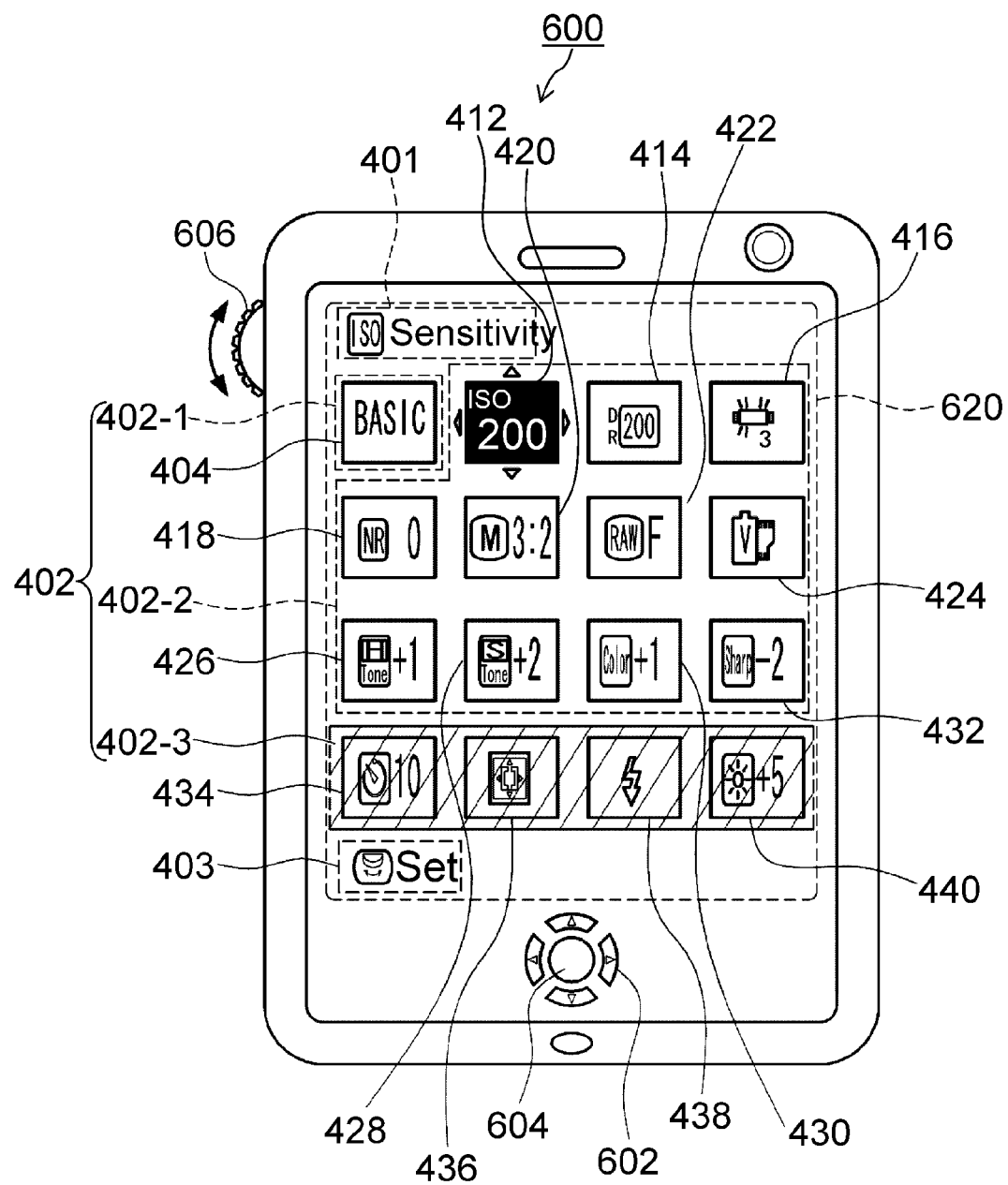
FIG. 16 is a diagram showing an example of an imaging condition setting screen in a smartphone 600 according to a modified example of the second embodiment.

FIG. 16 is a plan view showing another configuration example of a smartphone.

Only difference between a smartphone 600 shown in FIG. 16 and the smartphone 500 shown in FIG. 15 is a UI (user interface), and the other configurations are the same as the smartphone 500.

The smartphone 600 shown in FIG. 16 includes a monitor 620 in which touch input is not possible, cross keys 602, a MENU/OK key 604, and a rotary dial 606 in place of the display input unit 520 in which touch input is possible and the operation unit 540.

Here, the monitor 620, the cross keys 602, the MENU/OK key 604, and the rotary dial 606 correspond to the monitor 213, the cross keys 222, the MENU/OK key 224, and the rotary dial 223 of the imaging apparatus 100 shown in FIG. 2.

The monitor 620, the cross keys 602, the MENU/OK key 604, and the rotary dial 606 can be used to set the parameter of each function corresponding to each setting icon as in the imaging apparatus 100.

[Other]

Although the parameters used for setting the functions exerted during imaging by the imaging unit included in the portable electronic device and the parameters used for setting functions exerted during image processing of taken images have be described in the second embodiment, the types of the parameters for which the setting is changed by the present invention are not limited to the embodiment. Various parameters are possible, and any parameters used to set various functions of the portable electronic device are possible.

The present invention is not limited to the first and second embodiments, and it is obvious that various modifications can be made without departing from the scope of the present invention.

What is claimed is:

1. A portable electronic device comprising:
a display unit;
a storage unit that stores parameters for a plurality of pages, each page including a plurality of parameters for respectively setting a plurality of functions of the device;
a first display control unit that can display, on the display unit, a list screen in which a plurality of icons including a plurality of setting icons corresponding respectively to the plurality of functions and a single page icon are two-dimensionally arranged, the list screen having a same arrangement pattern between the plurality of pages, wherein when an instruction input for selecting one of the plurality of pages is received, a plurality of parameters corresponding to the selected one of the pages are read from the storage unit, contents of the plurality of read parameters are displayed respectively onto the plurality of setting icons, and page information of a current list screen is displayed onto the page icon;
a second display control unit: that receives an instruction input for selecting one of the plurality of icons displayed on the display unit; and displays the selected one of the icons distinguishably from the icons other than the selected one of the icons on the display unit;
a third display control unit that: when one of the plurality of setting icons is selected and an instruction input for setting a parameter corresponding to the selected one of the setting icons is received, displays setting content of the parameter corresponding to the instruction input onto the selected one of the setting icons; and when the page icon is selected and an instruction input for selecting a page is received, displays page information of the selected page onto the page icon; and
a parameter setting unit that updates a plurality of parameters corresponding to a page of a list screen currently displayed on the display unit among the plurality of pages stored in the storage unit based on setting content of the parameter, wherein
when the instruction input of parameter setting is performed for the selected one of the plurality of setting icons and the setting content of the parameter corresponding to the instruction input is incompatible with any of the parameters that are set for the setting icons other than the selected one of the setting icons,
the third display control unit displays, on the display unit, information indicating that the setting content of the parameter corresponding to the instruction input is incompatible, and the third display control unit does not display the setting content of the parameter corresponding to the instruction input onto the selected one of the setting icons or the third display control unit displays a warning onto the selected one of the setting icons.

2. The portable electronic device according to claim 1, further comprising
a first operation unit for displaying the list screen on the display unit, wherein
when an instruction input is received from the first operation unit, the first display control unit displays, on the display unit, a list screen of the two-dimensionally arranged icons corresponding respectively to a plurality of parameters of a page operated or displayed lastly in a previous time.

3. The portable electronic device according to claim 1, further comprising:
a second operation unit for selecting one of the two-dimensionally arranged icons;
a third operation unit for switching setting content by the selected one of the icons selected by the second operation unit; and
a fourth operation unit for confirming the plurality of parameters displayed on the list screen, wherein:
the second display control unit displays the selected one of the icons distinguishably from the icons other than the selected one of the icons on the display unit based on an operation input from the second operation unit,
the third display control unit switches the setting content displayed onto the selected one of the icons based on an operation input from the third operation unit, and
based on an operation input from the fourth operation unit, the parameter setting unit updates the parameter corresponding to the page currently displayed on the display unit among the parameters of the plurality of pages stored in the storage unit based on the setting content of the parameter and sets the setting content of the parameter as a parameter applied to the device.

4. The portable electronic device according to claim 2, further comprising:
a second operation unit for selecting one of the two-dimensionally arranged icons;
a third operation unit for switching setting content by the selected one of the icons selected by the second operation unit; and
a fourth operation unit for confirming the plurality of parameters displayed on the list screen, wherein:
the second display control unit displays the selected one of the icons distinguishably from the icons other than the selected one of the icons on the display unit based on an operation input from the second operation unit,
the third display control unit switches the setting content displayed onto the selected one of the icons based on an operation input from the third operation unit, and
based on an operation input from the fourth operation unit, the parameter setting unit updates the parameter corresponding to the page currently displayed on the display unit among the parameters of the plurality of pages stored in the storage unit based on the setting content of the parameter and sets the setting content of the parameter as a parameter applied to the device.

5. The portable electronic device according to claim 1, further comprising:
a second operation unit for selecting one of the two-dimensionally arranged icons; and
a third operation unit for switching setting content by the selected one of the icons selected by the second operation unit, wherein
when the page icon is selected by an operation of the second operation unit and an instruction input for selecting a page by an operation of the third operation unit is received, the first display control unit reads a plurality of parameters corresponding to the selected page among the parameters of the plurality of pages stored in the storage unit, displays the contents of the plurality of read parameters respectively onto the plurality of setting icons, and displays page information of the selected page onto the page icon.

6. The portable electronic device according to claim 2, further comprising:
a second operation unit for selecting one of the two-dimensionally arranged icons; and
a third operation unit for switching setting content by the selected one of the icons selected by the second operation unit, wherein when the page icon is selected by an operation of the second operation unit and an instruction input for selecting a page by an operation of the third operation unit is received, the first display control unit reads a plurality of parameters corresponding to the selected page among the parameters of the plurality of pages stored in the storage unit, displays the contents of the plurality of read parameters respectively onto the plurality of setting icons, and displays page information of the selected page onto the page icon.

7. The portable electronic device according to claim 3, further comprising:
a second operation unit for selecting one of the two-dimensionally arranged icons; and
a third operation unit for switching setting content by the selected one of the icons selected by the second operation unit, wherein
when the page icon is selected by an operation of the second operation unit and an instruction input for selecting a page by an operation of the third operation unit is received, the first display control unit reads a plurality of parameters corresponding to the selected page among the parameters of the plurality of pages stored in the storage unit, displays the contents of the plurality of read parameters respectively onto the plurality of setting icons, and displays page information of the selected page onto the page icon.

8. The portable electronic device according to claim 4, further comprising:
a second operation unit for selecting one of the two-dimensionally arranged icons; and
a third operation unit for switching setting content by the selected one of the icons selected by the second operation unit, wherein
when the page icon is selected by an operation of the second operation unit and an instruction input for selecting a page by an operation of the third operation unit is received, the first display control unit reads a plurality of parameters corresponding to the selected page among the parameters of the plurality of pages stored in the storage unit, displays the contents of the plurality of read parameters respectively onto the plurality of setting icons, and displays page information of the selected page onto the page icon.

9. The portable electronic device according to claim 2, wherein
when the instruction input of parameter setting is performed for the selected one of the plurality of setting icons and the setting content of the parameter corresponding to the instruction input is incompatible with any of the parameters that are set for the setting icons other than the selected one of the setting icons,
the third display control unit displays, on the display unit, information indicating that the setting content of the parameter corresponding to the instruction input is incompatible, and the third display control unit does not display the setting content of the parameter corresponding to the instruction input onto the selected one of the setting icons or the third display control unit displays a warning onto the selected one of the setting icons.

10. The portable electronic device according to claim 3, wherein
when the instruction input of parameter setting is performed for the selected one of the plurality of setting icons and the setting content of the parameter corresponding to the instruction input is incompatible with any of the parameters that are set for the setting icons other than the selected one of the setting icons,
the third display control unit displays, on the display unit, information indicating that the setting content of the parameter corresponding to the instruction input is incompatible, and the third display control unit does not display the setting content of the parameter corresponding to the instruction input onto the selected one of the setting icons or the third display control unit displays a warning onto the selected one of the setting icons.

11. The portable electronic device according to claim 4 wherein
when the instruction input of parameter setting is performed for the selected one of the plurality of setting icons and the setting content of the parameter corresponding to the instruction input is incompatible with any of the parameters that are set for the setting icons other than the selected one of the setting icons,
the third display control unit displays, on the display unit, information indicating that the setting content of the parameter corresponding to the instruction input is incompatible, and the third display control unit does not display the setting content of the parameter corresponding to the instruction input onto the selected one of the setting icons or the third display control unit displays a warning onto the selected one of the setting icons.

12. The portable electronic device according to claim 1, wherein
the first display control unit two-dimensionally arranges and displays the plurality of setting icons and the page icon so that the plurality of setting icons and the page icon do not overlap with each other.

13. The portable electronic device according to claim 2, wherein
the first display control unit two-dimensionally arranges and displays the plurality of setting icons and the page icon so that the plurality of setting icons and the page icon do not overlap with each other.

14. The portable electronic device according to claim 1, wherein
the first display control unit displays the page icon on any of four corners of the list screen.

15. The portable electronic device according to claim 1, wherein
when one of the icons two-dimensionally arranged on the list screen of the display unit is selected, information indicating the parameter that is set by the selected one of the icons is displayed on an upper part of the list screen.

16. The portable electronic device according to claim 1, wherein
the plurality of pages include a page including parameters automatically set by the device as parameters corresponding respectively to the plurality of setting icons.

17. The portable electronic device according to claim 16, wherein
when the page including the parameters automatically set by the device is displayed, the first display control unit displays information indicating that the parameters are automatically set parameters onto the setting icons corresponding to the parameters automatically set by the device.

18. The portable electronic device according to claim 1, further comprising:
an imaging unit including an imaging optical system and an imaging element that forms a subject image through the imaging optical system;

an image processing unit that processes an image output from the imaging unit; and an image recording unit that records the image processed by the image processing unit, wherein the plurality of parameters include at least one of a parameter that is set at imaging by the imaging unit and a parameter that is set for the image processing in the image processing unit.

19. A display control method of a portable electronic device comprising: a display unit; and a storage unit that stores parameters for a plurality of pages, each page including a plurality of parameters for respectively setting a plurality of functions of the device, the display control method comprising:

a first display control step capable of displaying, on the display unit, a list screen in which a plurality of icons including a plurality of setting icons corresponding respectively to the plurality of functions and a single page icon are two-dimensionally arranged, the list screen having a same arrangement pattern between the plurality of pages, wherein when an instruction input for selecting one of the plurality of pages is received, a plurality of parameters corresponding to the selected one of the pages are read from the storage unit, contents of the plurality of read parameters are displayed respectively onto the plurality of setting icons, and page information of a current list screen is displayed onto the page icon;

a second display control step of: receiving an instruction input for selecting one of the plurality of icons displayed on the display unit; and displaying the selected one of the icons distinguishably from the icons other than the selected one of the icons on the display unit;

a third display control step of: when one of the plurality of setting icons is selected and an instruction input for setting a parameter corresponding to the selected one of the setting icons is received, displaying setting content of the parameter corresponding to the instruction input onto the selected one of the setting icons; and when the page icon is selected and an instruction input for selecting a page is received, displaying page information of the selected page onto the page icon; and a parameter setting step of updating a plurality of parameters corresponding to a page of a list screen currently displayed on the display unit among the plurality of pages stored in the storage unit based on setting content of the parameter, wherein the third display control step includes a step of:

when the instruction input of parameter setting is performed for the selected one of the plurality of setting icons and the setting content of the parameter corresponding to the instruction input is incompatible with any of the parameters that are set for the setting icons other than the selected one of the setting icons, displaying, on the display unit, information indicating that the setting content of the parameter corresponding to the instruction input is incompatible, and not displaying the setting content of the parameter corresponding to the instruction input onto the selected one of the setting icons or displaying a warning onto the selected one of the setting icons.

* * * * *